United States Patent
Yang et al.

(10) Patent No.: US 11,403,364 B2
(45) Date of Patent: Aug. 2, 2022

(54) METHOD AND TERMINAL DEVICE FOR EXTRACTING WEB PAGE CONTENT

(71) Applicant: Huawei Technologies Co., Ltd., Shenzhen (CN)

(72) Inventors: Jiandong Yang, Shanghai (CN); Zhiqiang Yu, Shanghai (CN); Wenshuai Yin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/847,168

(22) Filed: Apr. 13, 2020

(65) Prior Publication Data

US 2020/0242186 A1 Jul. 30, 2020

Related U.S. Application Data

(63) Continuation of application No. PCT/CN2018/109757, filed on Oct. 11, 2018.

(30) Foreign Application Priority Data

Oct. 13, 2017 (CN) .......................... 201710953935.5

(51) Int. Cl.
 *G06F 16/957* (2019.01)
 *G06F 16/958* (2019.01)
 *G06F 16/93* (2019.01)
(52) U.S. Cl.
 CPC .......... *G06F 16/9577* (2019.01); *G06F 16/93* (2019.01); *G06F 16/9574* (2019.01); *G06F 16/972* (2019.01)
(58) Field of Classification Search
 CPC ................................................. G06F 16/9577
 See application file for complete search history.

(56) References Cited

U.S. PATENT DOCUMENTS 7,685,229 B1 * 3/2010 George et al. .......... G06F 15/16
9,208,249 B2 12/2015 Crockett et al.
(Continued)

FOREIGN PATENT DOCUMENTS

CN 101937438 B 6/2013
CN 103246699 A 8/2013
(Continued)

OTHER PUBLICATIONS

Luo, T., et al., "Attacks on WebView in the Android System," XP055716050, Proceedings of the 27th Annual Computer Security Applications Conference, 2011, pp. 343-352.

*Primary Examiner* — James J Debrow
(74) *Attorney, Agent, or Firm* — Conley Rose, P.C.

(57) ABSTRACT

A method for extracting web page content in a terminal device, where a system service in a framework of an operating system drives a web page display component execution environment to complete a control layout and control rendering on a user interface of an application program, where a web page display component is identified from a view control included in the user interface, and then instructions for content extraction and instructions for information feedback are inserted, through an interface of the identified web page display component, into a web page embedded in the user interface of the application program. The instructions for content extraction extracts content at a specified location on the web page based on a custom web event, and the instructions for information feedback transfers the extracted web page content to the operating system.

20 Claims, 13 Drawing Sheets

(56) References Cited

U.S. PATENT DOCUMENTS

| | | | | |
|---|---|---|---|---|
| 10,650,073 | B1* | 5/2020 | Manzi et al. | G06F 16/9577 |
| 2004/0139397 | A1* | 7/2004 | Yuan et al. | G06F 17/21 |
| 2008/0115057 | A1* | 5/2008 | Grandhi et al. | G06F 17/00 |
| 2012/0210203 | A1 | 8/2012 | Kandekar et al. | |
| 2014/0337699 | A1* | 11/2014 | Tang et al. | G06F 17/22 |
| 2014/0359413 | A1* | 12/2014 | Song | G06F 17/30 |
| 2015/0074513 | A1* | 3/2015 | Liang et al. | G06F 17/2247 |
| 2015/0074561 | A1* | 3/2015 | Zhou | G06F 3/048 |
| 2016/0012213 | A1 | 1/2016 | Walsh | |

FOREIGN PATENT DOCUMENTS

| | | |
|---|---|---|
| CN | 102663023 B | 9/2014 |
| CN | 105204806 A | 12/2015 |
| CN | 105701164 A | 6/2016 |
| CN | 106897215 A | 6/2017 |
| WO | 2015149664 A1 | 10/2015 |

* cited by examiner

METHOD AND TERMINAL DEVICE FOR EXTRACTING WEB PAGE CONTENT

CROSS-REFERENCE TO RELATED APPLICATIONS

This application is a continuation of International Patent Application No. PCT/CN2018/109757 filed on Oct. 11, 2018, which claims priority to Chinese Patent Application No. 201710953935.5 filed on Oct. 13, 2017. The disclosures of the aforementioned applications are hereby incorporated by reference in their entireties.

TECHNICAL FIELD

This application relates to the computer field, and in particular, to a method for extracting web page content and a terminal device.

BACKGROUND

A terminal device represented by a smartphone provides people with various services using various application programs (briefly referred to as "applications"), and increasingly becomes an indispensable tool in people's daily life, and a user interface is a medium for interaction and information exchange between an application and a user. Currently, more applications on the terminal device belong to hybrid applications. Such applications usually display information to the user by embedding a web page in the user interface. Web page code written in a programming language such as a hypertext markup language (HTML) or a cascading style sheet (CSS) is loaded, parsed, and rendered by a browser or a web page display component, and then is finally presented as content such as an image, a text, or a video that can be recognized by the user.

It can be learned that a web page is an important carrier for information exchange between a user and an application program. If the terminal device can accurately extract valid content at a specified location on the web page, interaction during information browsing by the user can be improved greatly, and many application scenarios can be further extended. For example, web page content at a location at which the user taps may be collected to analyze a hobby of the user and create a user portrait, and various intelligent services such as content push, service recommendation, and situational dialogue are further performed. Therefore, performing accurate and efficient web page content extraction on the terminal device has a great technical value.

However, a continuous increase in a quantity and types of applications causes fragmentation of the terminal device. This means that there may be a plurality of different web page display components in the terminal device, and different applications may load and display a web page using different web page display components. For example, an internal system application usually displays a web page using a browser or a web page display component that is embedded in an operating system, but some third-party applications display a web page using a private web page display component. Currently, an operating system of the terminal device can extract only web page content of an application that uses a web page display component embedded in the system, that is, the operating system can support only extraction of web page content of some applications. However, content of a web page embedded in an interface of a new application or some third-party hybrid applications that use a private web page display component cannot be extracted. Therefore, a current web page content extraction technology is greatly limited by a type of an application or a type of a web page display component used by an application. Consequently, the operating system of the terminal device cannot accurately extract web page content of various types of applications, and an application scenario of a service based on web page content extraction is greatly limited.

SUMMARY

This application provides a method for extracting web page content that is compatible with a plurality of applications, and a terminal device that is configured to implement the content extraction method, to accurately extract content at a specified location from a web page embedded in a user interface of an application program.

According to a first aspect, an embodiment of this application provides a method for extracting web page content in a terminal device, including identifying, by an operating system of the terminal device, a web page display component of an application program, where the web page display component is used by the application program to load and display a web page included in a user interface, invoking, by the operating system, an interface of the web page display component to inject a content extraction module and an information feedback module into the web page, extracting, by the content extraction module from the web page based on a web event distributed by the web page display component, content corresponding to first web page coordinates, where the web event includes the first web page coordinates, and transferring, by the information feedback module to the operating system, the content extracted by the content extraction module. In the foregoing technical solution, all web page display components of different application programs can be identified at an operating system level, and the content extraction module is further dynamically injected into the web page through the interface of the web page display component, to extract web page content. This resolves a problem that page content of all types of applications cannot be extracted due to fragmentation of the terminal device, and can be compatible with different types of application programs, to ensure that content of web pages embedded in interfaces of various types of application programs can be accurately extracted.

In a possible implementation, a control that matches a feature model of the web page display component may be identified based on a feature of at least one control included in the user interface of the application program. The identified control is the web page display component of the application program, and the feature model of the web page display component represents a common feature of a plurality of web page display components. In this solution, function features of the plurality of web page display components are extracted, the feature model is established, and then a control that matches a feature of the web page display component is dynamically identified based on the feature of the control included in the user interface. This not only resolves a problem of identifying web page display components of all current applications, but also ensures identification of a web page display component of an application newly added in the future.

In a possible implementation, the feature of the control includes at least one of a function feature and a behavior feature. The function feature of the control includes an interface function feature of the control, and the interface function feature is used to represent or describe a function of an interface of the control. The behavior feature of the control includes a rendering feature of the control, the rendering feature is used to represent or describe a feature of a rendering operation performed by the control, and the feature of the rendering operation includes a drawing operation, drawing content, and drawing coordinates.

In a possible implementation, identifying a web page display component of an application program includes identifying, from a plurality of view controls included in the interface of the application program, a view control whose interface function feature best matches a function model of the web page display component, where the identified view control is the web page display component of the application program. The function model represents a necessary function of the web page display component, and the necessary function includes at least one of page loading, page refreshing, history management, and address navigation.

In a possible implementation, identifying a web page display component of an application program includes identifying, from a plurality of view controls included in the interface of the application program, a view control whose rendering feature best matches a rendering model, where the identified view control is the web page display component of the application program. The rendering model represents a feature of a drawing operation that needs to be completed to render a web page, and the feature of the drawing operation includes at least one of a drawing manner, drawing content, and drawing coordinates.

In a possible implementation, identifying a web page display component of an application program includes searching a preconfigured first database for an identifier of the web page display component of the application program based on an identifier of the application program, where the first database stores a correspondence between the identifier of the application program and the identifier of the web page display component of the application program, and determining, from at least one control included in the user interface, a control whose identifier corresponds to the identifier of the web page display component, where the determined control is the web page display component of the application program, and the at least one control includes the web page display component of the application program. In this solution, web page display components used by a plurality of applications are analyzed offline, and a correspondence between an application and a web page display component is stored in a database. In this way, the web page display component of the application program can be quickly learned by searching the database, thereby reducing occupation of system resources.

In a possible implementation, if the identifier of the web page display component of the application program is not found from the preconfigured first database based on the identifier of the application program, a control that matches a feature model of the web page display component is identified based on a feature of at least one control included in the user interface of the application program, and the correspondence between the identifier of the web page display component of the application program and the identifier of the application program is added to the first database to dynamically update the database, and ensure efficient identification of a web page display component of a new application program.

In a possible implementation, an occasion for injecting the content extraction module and the information feedback module is related to an injection policy, and the injection policy includes an optimal injection policy and a suboptimal injection policy. The injection policy is determined when the application program is being installed or when the user interface of the application program is being created. The optimal injection policy indicates that the content extraction module and the information feedback module may be injected on demand. To be specific, the content extraction module and the information feedback module are injected when content of a web page embedded in the user interface needs to be extracted. The suboptimal injection policy indicates that only the content extraction module may be injected on demand, but the information feedback module cannot be injected on demand, and the information feedback module needs to be injected before the web page is loaded.

In a possible implementation, a preconfigured second database may be searched based on the identifier of the application program or the identifier of the web page display component to determine an injection policy corresponding to the web page display component. The second database stores a correspondence among an identifier of at least one application program, an identifier of at least one web page display component, and the at least one injection policy. The second database and the first database may be different databases or may be a same database.

In a possible implementation, when the injection policy is the optimal injection policy, after the user interface of the application program is displayed, the interface of the web page display component may be invoked to simultaneously inject the content extraction module and the information feedback module into the web page, or when the injection policy is the suboptimal injection policy, when the user interface of the application program is being created, before the web page display component loads the web page on the user interface, the interface of the web page display component may be invoked to inject the information feedback module into the web page.

In a possible implementation, the content extraction module traverses a document object model (DOM) tree of the web page to determine a target node corresponding to the first location, the target node is a paragraph of text or an image, and content corresponding to the target node and content corresponding to a node around the target node are simultaneously extracted based on a display attribute of the target node and a display attribute of the node around the target node. In this method, a case in which content corresponding to a plurality of nodes of the DOM tree of the web page is combined for display can be identified to accurately extract content in which a user is really interested.

In a possible implementation, if a quantity of space characters included in content corresponding to the target node is greater than a specified threshold, the content extraction module extracts some content before the space character in the content or some content after the space character in the content. In this method, a case in which content corresponding to one node of the DOM tree of the web page is divided for display can be identified to accurately extract content in which a user is really interested.

In a possible implementation, if a quantity of characters included in content corresponding to the target node is greater than a specified threshold, the content extraction module extracts only characters with a specified length that are close to the first location in the content. In this method, for a large paragraph of content of the web page, partial content can be specially extracted to avoid system resource waste due to extraction of a large amount of invalid content.

In a possible implementation, the operating system distributes a custom system event to trigger the content extraction module to perform an extraction operation, and the custom system event is generated based on a user operation or is simulated by the operating system.

In a possible implementation, the web page display component of the application program or another component of the operating system converts the custom system event into a custom web event, and after obtaining the custom web event through listening, an event listener triggers the content extraction module to perform an extraction operation. The custom system event does not conflict with an existing system event of the operating system. Correspondingly, the custom web event and processing logic of the custom web event do not conflict with another type of existing web event either. Therefore, distribution and processing of another web event on the page are not interfered with. In addition, the event listener listens to only the custom web event, thereby reducing impact of an entire page content extraction procedure on the page.

In a possible implementation, after web page content extraction is completed, the content extraction module and the information feedback module are removed.

In a possible implementation, the content extraction module and the information feedback module are JAVASCRIPT (JS) code or programs implemented in a JS language, and run in a JS execution environment.

In a possible implementation, the information feedback module transfers the extracted content to a page context using a JS binding mechanism, and the page context transfers, in a JAVA Native Interface (JNI) manner, the content to a system service running in a system runtime.

In a possible implementation, the identifier of the application program is an identifier of an installation package of the application program, and the identifier of the web page display component is signature information of the web page display component.

According to a second aspect, an embodiment of the present disclosure provides a method for extracting web page content, including determining, by an operating system, a display list corresponding to a user interface of an application program, where the display list records a plurality of to-be-performed drawing operations, the plurality of drawing operations are used to draw the user interface, the user interface includes a web page, and each drawing operation includes at least drawing content and drawing coordinates, determining a target drawing operation from the display list in response to a first event, where drawing coordinates of the target drawing operation correspond to coordinates carried in the first event, and drawing content of the target drawing operation is some or all content of the web page, and extracting the drawing content of the target drawing operation. In this technical solution, a problem of extracting web page content when the web page display component of the application program cannot be identified or the content extraction module and the information feedback module cannot be injected in an extreme scenario is resolved.

In a possible implementation, the first event is a custom system event.

In a possible implementation, the custom system event is triggered by a user operation or is simulated by the operating system.

In a possible implementation, the coordinates carried in the first event are web page coordinates indicating a first location on the web page, and the drawing coordinates of the target drawing operation are the same as the web page coordinates, or a distance between the drawing coordinates of the target drawing operation and the web page coordinates falls within a preset range.

According to a third aspect, an embodiment of the present disclosure provides a method for extracting web page content, including loading and displaying, by an application program using a web page display component, a web page included in a user interface of the application program, injecting a content extraction module and an information feedback module into the web page through an interface of the web page display component, and distributing, by the web page display component, a first event to the content extraction module, where the first event includes web page coordinates, and the web page coordinates indicate a first location on the web page such that after the first event is obtained through listening, the content extraction module extracts, from the web page, content corresponding to the first location, and transfers the extracted content to the application program using the information feedback module. In this technical solution, the application program dynamically injects the content extraction module and the information feedback module into a currently displayed web page through the interface of the web page display component of the application program, to extract web page content. In comparison with an existing extraction scheme, resource overheads are lower, and extraction efficiency is higher.

According to a fourth aspect, an embodiment of this application provides a terminal device, including one or more functional units that are configured to perform the method described in any one of the first aspect to the third aspect, where the functional units may be implemented by a software module, or implemented by hardware such as a processor, or implemented by software in combination with necessary hardware.

According to a fifth aspect, an embodiment of this application provides a terminal device, including a memory, a processor, and a computer program stored in the memory, where steps of the method described in any one of the first aspect to the third aspect are implemented when the processor executes the computer program.

According to a sixth aspect, an embodiment of this application provides a computer readable storage medium, where the computer readable storage medium stores a computer program (an instruction), and steps of the method described in any one of the first aspect to the third aspect are implemented when the program (instruction) is executed by a processor.

In any one of the foregoing aspects or the possible implementations of the foregoing aspects, the content extraction module and the information feedback module are code or programs implemented in a script language, and are added to source code of the web page, and after the code or programs are parsed and executed by a web runtime corresponding to the web page, a content extraction function and an information feedback function are implemented. After parsing the source code of the web page, a web page execution environment (page context) of the web runtime obtains the DOM tree of the web page. The content extraction module and the information feedback module are located below a head node or a body node of the DOM tree of the web page.

In any one of the foregoing aspects or the possible implementations of the foregoing aspects, when the code or the programs corresponding to the content extraction module and the information feedback module are directly injected into the web runtime of the web page, a script execution environment of the web runtime executes the code or the programs to implement the content extraction function and the information feedback function.

In any one of the foregoing aspects or the possible implementations of the foregoing aspects, the code or the programs corresponding to the content extraction module and the information feedback module may be integrated into the operating system, or may be prestored in a memory of the terminal device, and the operating system or the web runtime of the web page may access and obtain the code or the programs using a file system, or the operating system or the web runtime may download and obtain, from a network side, the code or the programs corresponding to the content extraction module and the information feedback module.

In the foregoing technical solutions of this application, intelligent extraction of content of an internal system application and various types of third-party applications is implemented at the operating system level using a unified content extraction technology. This is accurate and efficient, and has low power consumption and low memory occupation.

BRIEF DESCRIPTION OF DRAWINGS

To describe the technical solutions in some of the embodiments of this application more clearly, the following briefly describes the accompanying drawings describing some of the embodiments of this application.

DESCRIPTION OF EMBODIMENTS

Figure 1:
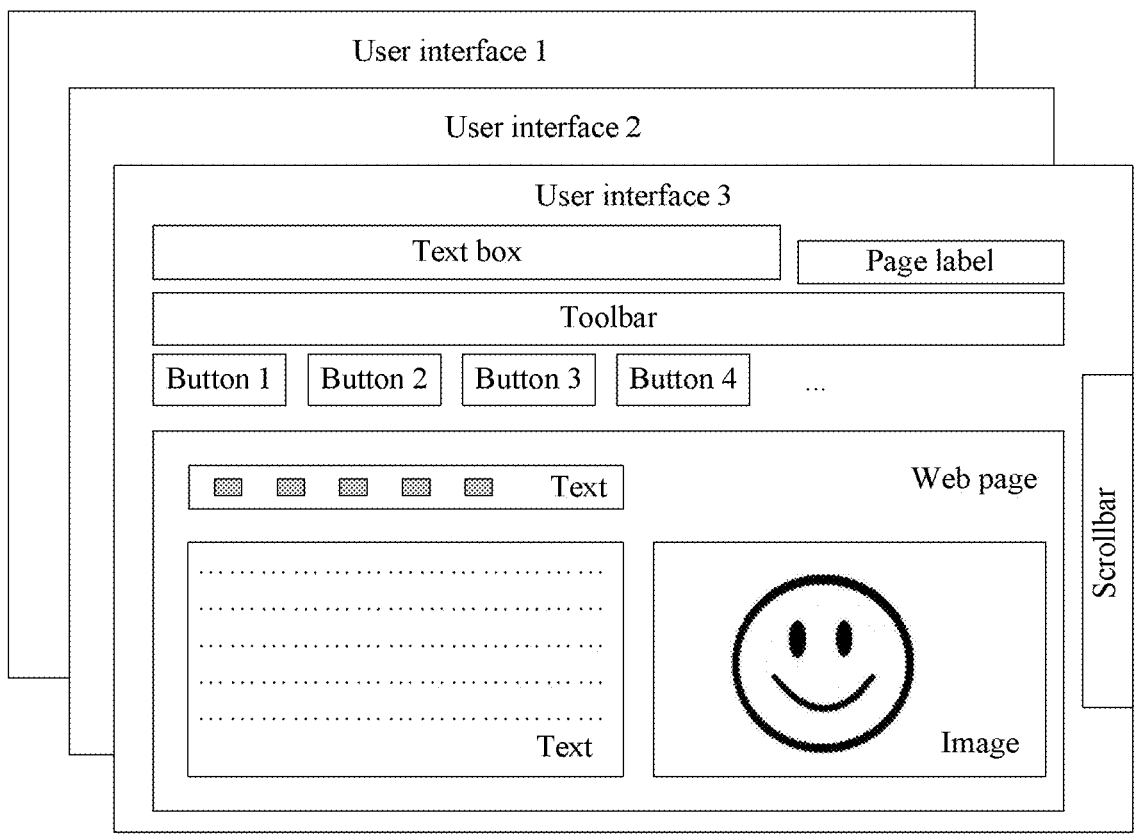
FIG. 1 is a schematic diagram of a user interface of an application program according to an embodiment of this application.

The following describes in detail the technical solutions in the embodiments of this application with reference to the accompanying drawings in the embodiments of this application. The described embodiments are merely some but not all of the embodiments of this application.

A method for extracting web page content provided in the embodiments of this application is used to extract content of a web page displayed on a terminal device. The terminal device is a device that provides voice and/or data connectivity for a user, and includes a wireless terminal or a wired terminal. The wireless terminal may communicate with one or more core networks through a radio access network (RAN). The wireless terminal may be a mobile terminal such as a mobile phone (or referred to as a "cellular" phone), or may be a computer with a mobile terminal, for example, a portable, pocket-sized, handheld, computer built-in, or in-vehicle mobile apparatus. The term "user interface", briefly referred to as an interface, in the specification, claims, and accompanying drawings of this application is a graphical interface for interaction and information exchange between a user and an application program or an operating system. The user interface may be a window, a dialog box, a display area, or the like. A user interface of an application program is source code written in a specific computer language such as JAVA or an Extensible Markup Language (XML). The interface source code is parsed and rendered on the terminal device, and is finally presented as content that can be identified by a user, for example, a control such as an image, a text, or a button. The control is also referred to as a widget, and is a basic element of the user interface. Typical controls include a toolbar, a menu bar, a text box, a button, a scrollbar, an image, and a text. An attribute and content of the control on the interface are defined using a label or a node. For example, the XML specifies, using a node such as <Textview>, <ImgView>, or <VideoView>, the control included in the interface. One node corresponds to one control on the interface or one attribute. After being parsed and rendered, the node is presented as content that is visible to the user. In addition, interfaces of many application programs such as a hybrid application usually further include a web page. The web page, also referred to as a page, may be understood as a special control that is embedded in an interface of an application program. The web page is source code written in a specific computer language, for example, an HTML, a CSS, or a JS. A browser or a web page display component whose function is similar to that of a browser may load and display the web page source code as content that can be identified by the user. Specific content included in the web page is also defined using a label or a node in the web page source code. For example, the HTML defines an element and an attribute of the web page using <p>, <img>, <video>, or <canvas>.

FIG. 1 shows an example of a user interface of an application program. As shown in FIG. 1, a user interface 3 of the application program includes a web page and controls such as a text box, a toolbar, a page label, and buttons. After being loaded, parsed, and rendered by a web page display component, the web page is displayed as content such as an image or a text that can be identified by a user. It should be understood that, in addition to the terminal device, the method for extracting web page content provided in the embodiments of this application may also be applied to another type of computer system.

Figure 2:
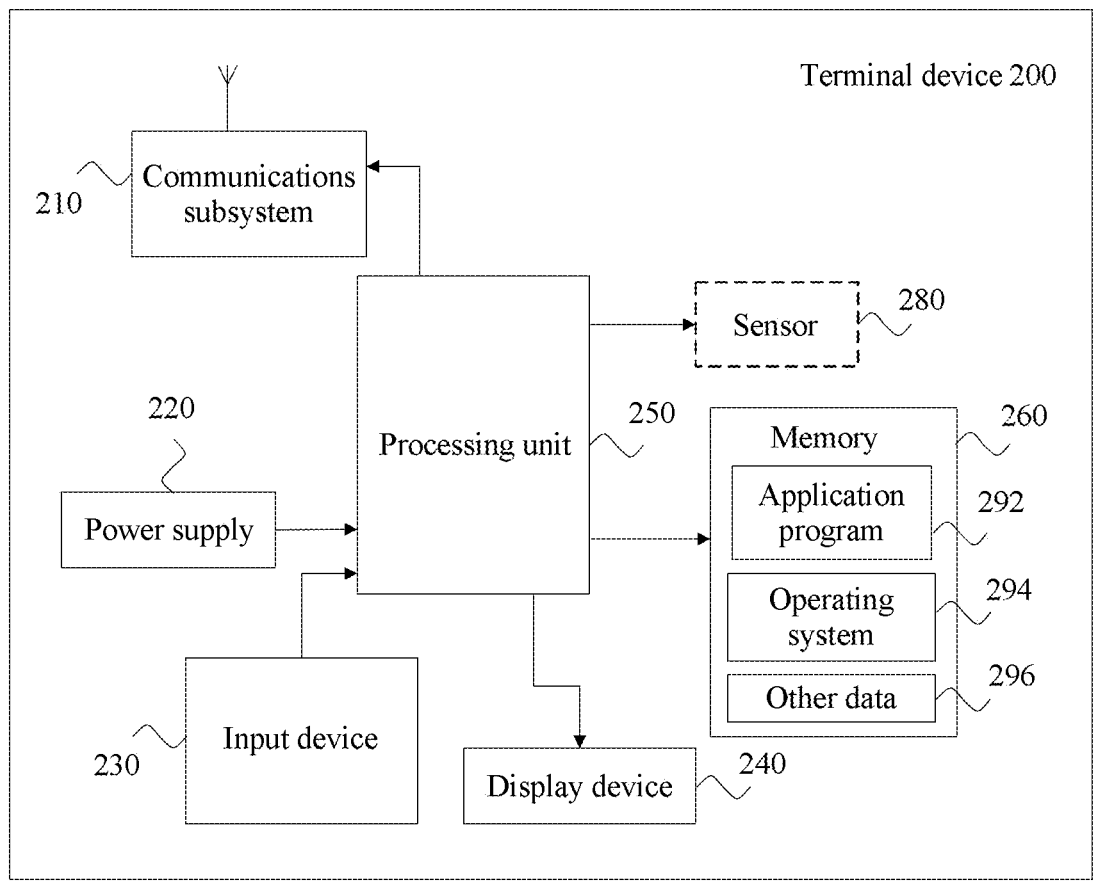
FIG. 2 is a schematic structural diagram of a terminal device according to an embodiment of this application.

FIG. 2 shows an example of a terminal device 200 according to an embodiment of this application. As shown in FIG. 2, the terminal device 200 includes a communications subsystem 210, a power supply 220, an input device 230, a display device 240, a processing unit 250, and a memory 260. The memory 260 stores a computer program or an instruction, and the computer program includes an operating system 294, an application program 292, and the like. The processing unit 250 is configured to execute the computer program in the memory 260 to implement a method defined by the computer program. For example, the processing unit 250 runs the operating system 294 to implement various functions of the operating system 294 on the terminal device 200.

The processing unit 250 may include one or more processors. For example, the processing unit 250 may include an application processor, a graphics processing unit (GPU), and a digital signal processor. When the processing unit 250 includes a plurality of processors, the plurality of processors may be integrated into a same chip, or each of the plurality of processors may be an independent chip.

The memory 260 further stores other data 296 in addition to the computer program. The other data 296 may include data, such as system data (for example, a configuration parameter of the operating system 294) and user data, generated in a running process of the operating system 294 or the application program 292.

The memory 260 usually includes an internal memory and an external memory. The internal memory includes but is not limited to a random access memory (RAM), a read-only memory (ROM), a cache, and the like. The external memory includes but is not limited to a flash memory, a hard disk, a Universal Serial Bus (USB) disk, and the like. The computer program is usually stored in the external memory, and the processing unit 250 loads the program from the external memory into the internal memory before executing the computer program.

In an embodiment, the operating system 294 includes a computer program used to implement the web page content extraction method provided in the embodiments of this application such that after running the operating system 294, the processing unit 250 implements steps of the web page content extraction method provided in the embodiments of this application.

The input device 230 is configured to receive information input by a user, such as digital/character information, a touch operation, or a gesture, and generate a corresponding input signal. Further, in an embodiment, the input device 230 includes a touch panel. The touch panel, also referred to as a touchscreen, may collect a touch operation performed by the user on the touch panel, and generate a touch signal to drive a related component to respond to the operation performed by the user. In addition to the touch panel, the input device 230 may further include another input device. The other input device includes but is not limited to one or more of a physical keyboard, a function key (for example, a volume control key or an on/off key), a trackball, a mouse, a joystick, and the like.

The display device 240 may be a display panel, for example, a liquid crystal display (LCD) or an organic light-emitting diode (OLED). In some embodiments, the touch panel may cover the display device 240 to form a touch display screen.

The communications subsystem 210 is a basic communications unit of the terminal device 200, and is configured to send and receive data for the terminal device 200. The power supply 220 is configured to supply power to the foregoing components, and may be a power management chip.

When the terminal device 200 is a wireless terminal, the communications subsystem 210 includes a wireless modem, and mainly implements functions such as baseband processing, modulation and demodulation, signal amplification and filtering, and balancing. In an embodiment, the communications subsystem 210 includes a baseband processor, a radio frequency circuit, and an antenna. The radio frequency circuit and the antenna are mainly responsible for signal sending and receiving. The baseband processor is responsible for signal processing, for example, signal analog-to-digital (A/D) and digital-to-analog (D/A) conversion or signal coding and decoding. The baseband processor supports one or more wireless communications standards. The wireless communications standards herein include but are not limited to Global System for Mobile Communications (GSM), code-division multiple access (CDMA), Wideband CDMA (WCDMA), High Speed Packet Access (HSPA), Long Term Evolution (LTE), and the like. The baseband processor may be an independent chip, or the baseband processor and a processor included in the processing unit 250 may be integrated into a same chip.

Optionally, the terminal device 200 may further include one or more sensors 280 such as an acceleration sensor and a light sensor.

The web page content extraction method provided in the embodiments of this application may be performed by a proper combination of software, hardware, and/or firmware of the terminal device 200. For example, the web page content extraction method may be performed by the operating system 294 shown in FIG. 2 in combination with necessary hardware.

In addition, a person skilled in the art may understand that the terminal device 200 may include fewer or more components than those shown in FIG. 2, and the terminal device 200 shown in FIG. 2 includes only components more related to a plurality of implementations disclosed in the embodiments of this application.

Figure 3:
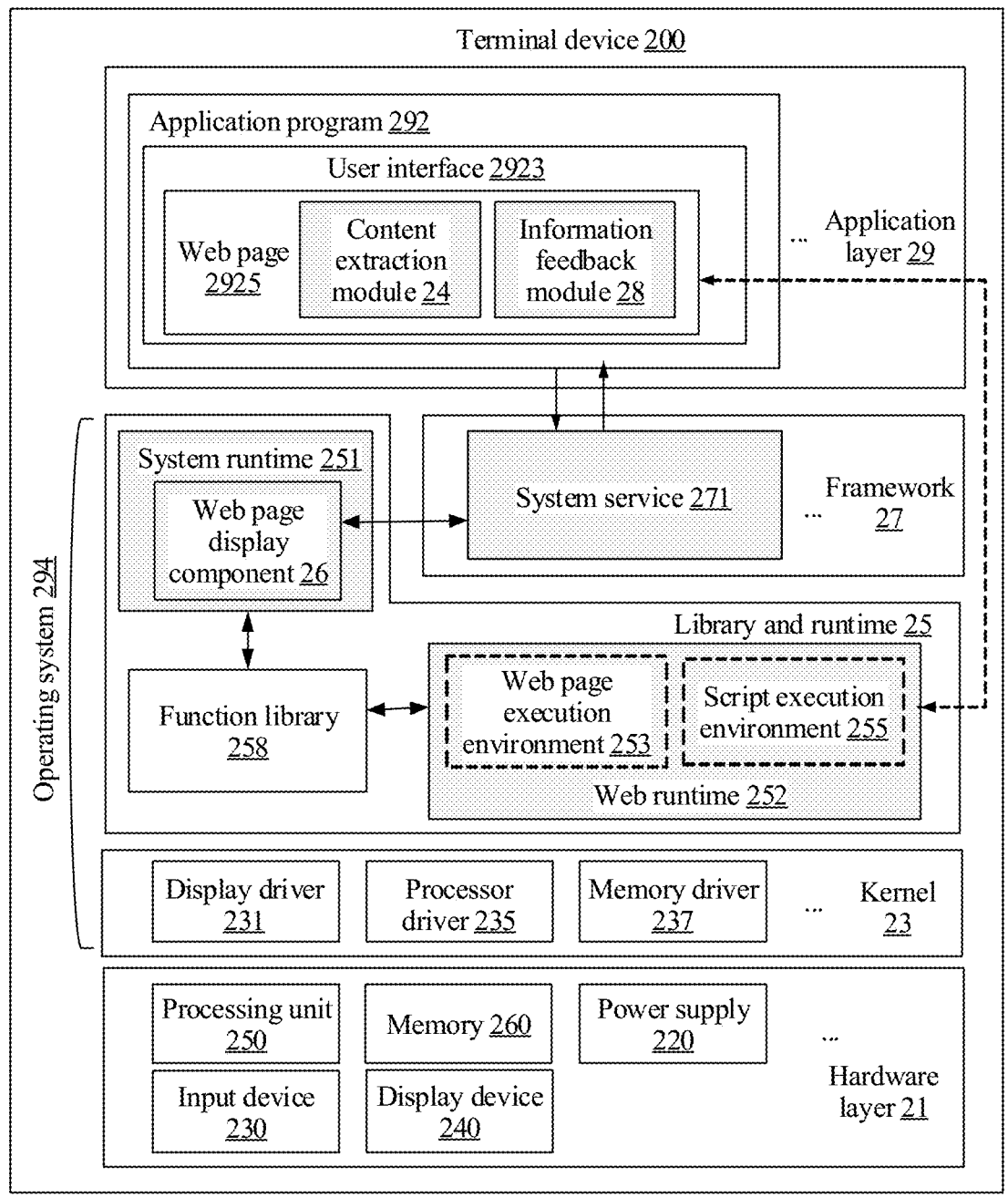
FIG. 3 is a schematic diagram of a logical architecture of a terminal device according to an embodiment of this application.

In an embodiment, components included in the terminal device 200 may be logically divided into a hardware layer 21, an operating system 294, and an application layer 29 shown in FIG. 3. The hardware layer 21 includes hardware resources such as the power supply 220, the processing unit 250, the memory 260, the input device 230, and the display device 240. The application layer 29 includes one or more application programs such as the application program 292. The application program 292 may be any type of application program such as a social application, a media player, or a browser. A user interface 2923 of the application program 292 includes a web page 2925 and another control. The operating system 294 serves as software middleware between the hardware layer 21 and the application layer 29, and is a computer program that manages and controls hardware and software resources. In an embodiment, the operating system 294 includes a kernel 23, a library and runtime 25, and a framework 27. The kernel 23 is configured to provide an underlying system component and an underlying system service, for example, security, memory management, process management, or a hardware driver. The hardware driver includes a display driver 231, a processor driver 235, a memory driver 237, and the like. The library and runtime 25 is also referred to as a runtime library, and provides a required library file and a required execution environment for an executable program in a runtime. In an embodiment, the library and runtime 25 includes a system runtime 251, a web runtime 252, and a function library 258. The system runtime 251 is a runtime environment of the operating system 294, for example, a virtual machine. The web runtime 252 mainly includes a web page execution environment (page context) 253 and a script execution environment (script context) 255. The page context 253 parses web page source code in a format such as HTML or CSS using a corresponding function library, and the script execution environment 255 parses, using a corresponding function library, code or an executable file that is implemented by executing a script language such as JS. The function library 258 is a computer program library that provides support for the executable program in the runtime, and includes a browser engine (for example, WEBKIT), a graphics processing engine, and the like. The framework 27 includes a system service 271 configured to provide various basic common components and services such as window management and location management for the application program at the application layer 29. A person skilled in the art may understand that the terminal device 200 may include fewer or more components than those shown in FIG. 3, and the terminal device shown in FIG. 3 includes only components more related to a plurality of implementations disclosed in the embodiments of this application.

In an embodiment, as shown in FIG. 3, the web page 2925 embedded in the user interface 2923 is loaded and displayed by a web page display component 26. The web page display component 26 may be a component that is included in the operating system 294 and that is configured to display a web page, or may be a private web page display component of the application program 292. The web page display component 26 runs in the system runtime 251, and is configured to load and display a web page. The web page display component 26 completes web page parsing and rendering and script parsing and execution using the web runtime 252, and finally presents content of the web page to the user. According to the web page content extraction method provided in the present disclosure, a content extraction module 24 and an information feedback module 28 are injected into the web page 2925 through an open interface of the web page display component 26. The content extraction module 24 extracts content at a specified location on the web page 2925 based on a system event distributed by the operating system 294, and the information feedback module 28 transfers the extracted content to the operating system 294. The operating system 294 further performs keyword extraction, content push, service recommendation, or the like based on the extracted content. The following describes in detail the web page content extraction method provided in the embodiments of this application.

Figure 4:
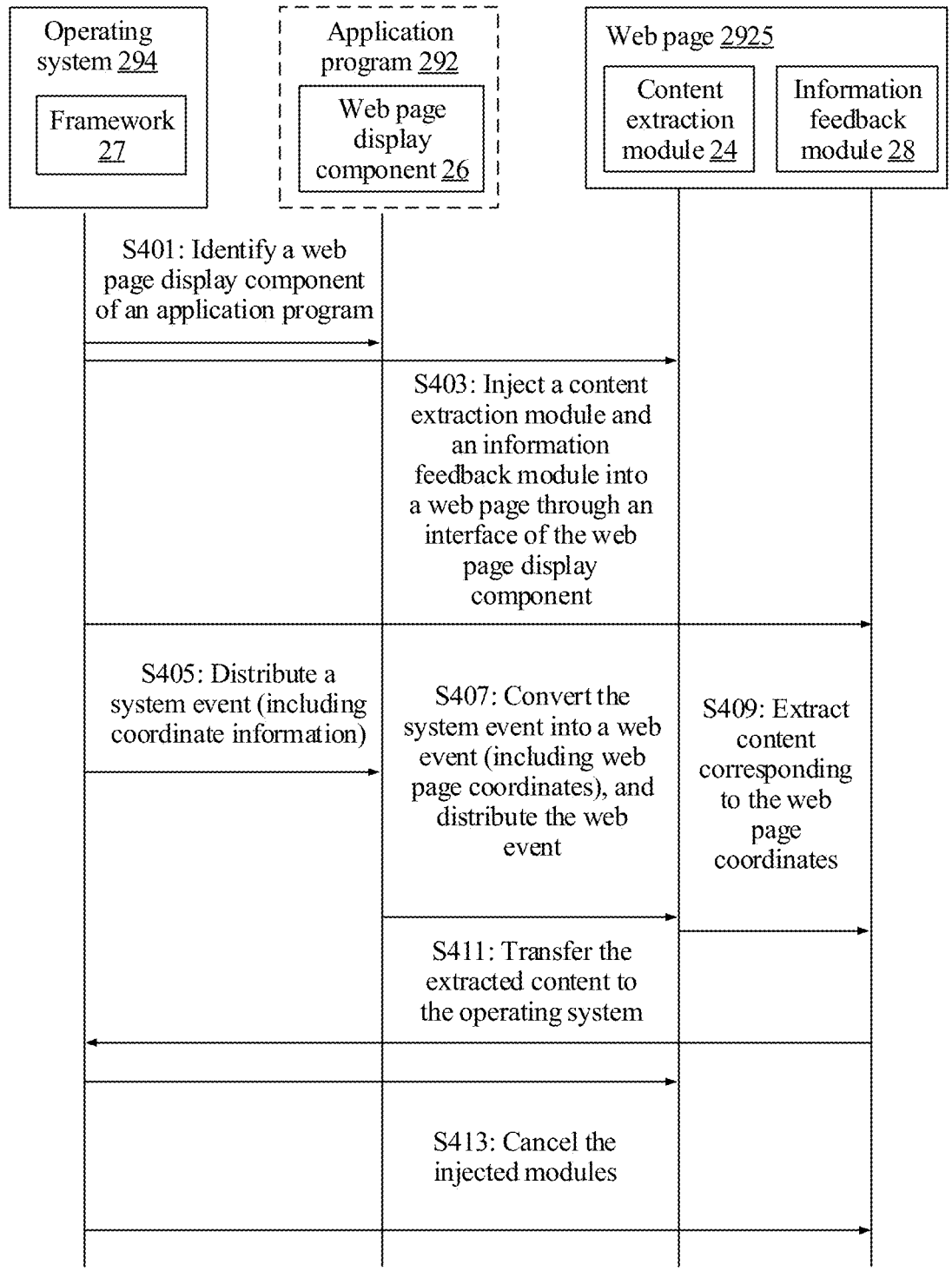
FIG. 4 is a flowchart of a method for extracting web page content according to an embodiment of this application.

As shown in FIG. 4, along with FIG. 3, a web page content extraction method provided in an embodiment of this application includes the following steps.

Step S401: An operating system 294 identifies a web page display component 26 of an application program 292. The web page display component is a function entity that is configured to load and display a web page, and functions as a browser. The operating system usually provides a native web page display component. For example, an ANDROID system provides a webview class used to display a web page, and an instance created based on the webview is a web page display component. Some application programs directly load and display a web page using the web page display component provided by the operating system. However, many application programs use a private web page display component instead of the web page display component of the operating system. Therefore, different application programs may load and display a web page using different web page display components. In step S401, the web page display component of the application program is dynamically identified based on a feature (for example, an identifier of an installation package) of the application program or a feature (for example, an interface function or a rendering operation) of a control included in an interface of the application program. An identification occasion may be a time when a current user interface 2923 of the application program 292 is being created, may be a time after the user interface 2923 is displayed, or may be an effective time point after the current user interface 2923 of the application program 292 is created and before the user interface 2923 is displayed. In an embodiment, step S401 may be implemented by a framework 27 included in the operating system 294, and may be implemented by a system service 271 in the framework by driving a web page display component execution environment. The web page display component execution environment runs in a system runtime, and the system service 271 may be native to the operating system 294, or may be obtained by modifying a native system service of the operating system 294. For a detailed identification method, refer to the following embodiment.

Step S403: The operating system 294 invokes an interface of the identified web page display component 26 to inject a content extraction module 24 and an information feedback module 28 into a web page 2925. The content extraction module 24 is configured to extract, from the web page 2925, content corresponding to specified coordinates, and the information feedback module 28 is configured to transfer, to the operating system 294 using a specific communication mechanism, the content extracted by the content extraction module 24. The content extraction module 24 and the information feedback module 28 are code, scripts, or other forms of computer programs implemented in a script language. The programs or code may be integrated into the operating system, for example, the framework 27 of the operating system, may be prestored in a memory 260 of a terminal device 200, or may be downloaded and obtained from a network side. The operating system 294 invokes a specific interface of the web page display component 26 to inject the programs or code corresponding to the content extraction module 24 and the information feedback module 28 into source code of the web page 2925. After parsing and executing the source code, a web runtime 252 corresponding to the web page 2925 implements a web page content extraction function and an information feedback function. Alternatively, the operating system 294 may directly transfer, through a specific interface of the web page display component 26, the programs or code corresponding to the content extraction module 24 and the information feedback module 28 to a script execution environment 255 of a web runtime 252. After running the programs or code, the script execution environment 255 implements a web page content extraction function and an information feedback function. For a more specific process of injecting the content extraction module 24 and the information feedback module 28, refer to the following embodiment.

Step S405: The operating system 294 distributes a system event that includes coordinate information to the web page display component 26. In an embodiment, the system event may be triggered by the operating system based on a user operation, for example, an operation (for example, tapping or dragging) performed by a user on an element or an area on the interface. The system generates a system event, and the system event includes system coordinates related to a location at which the user performs the operation. In another embodiment, the system event may be an event simulated by the operating system. The operating system 294 may simulate and distribute a system event at a specific occasion to trigger page content extraction. The simulated system event includes system coordinates obtained by the operating system through calculation based on specific logic. For example, the system event is simulated and distributed by the operating system 294 within preset duration after the web page 2925 is displayed, is simulated and distributed by the operating system 294 when the user performs no operation after the preset duration, or is simulated and distributed by the operating system 294 when a time for reading the web page by the user exceeds the preset duration.

Step S407: The web page display component 26 converts the system event distributed by the operating system 294 into a web event that a web runtime 252 can listen to and respond to, and distributes the web event, where the web event includes web page coordinates indicating a first location on the web page 2925. The event conversion operation includes at least conversion of the system coordinates included in the system event into the web page coordinates, and the web page coordinates correspond to content of an element or an area on the web page. In an embodiment, the system event distributed by the operating system 294 is a custom system event, and the custom system event is a newly added system event and does not conflict with an existing system event of the operating system. Correspondingly, the web event is also a custom web event, and the custom web event and processing logic of the custom web event do not conflict with another type of existing web event. Therefore, distribution and processing of another web event on the page are not interfered with. In an embodiment, the web page display component 26 directly distributes the custom web event to the content extraction module 24, and the content extraction module 24 performs a web page content extraction operation in response to the custom web event. In an embodiment, the web page display component 26 distributes the custom web event to a window node of a browser object model (BOM) tree corresponding to the web page 2925, the window node is a root node of the BOM tree, and the custom web event starts to be transferred from the window node to another node of the web page 2925. An event listener may be registered, and is specially configured to listen to the custom web event. After obtaining the custom web event through listening, the event listener triggers the content extraction module 24 to perform the web page content extraction operation. Further, the event listener may prevent the web event from being further transferred to reduce impact of an entire page content extraction procedure on the page.

Optionally, in an embodiment, before the system event distributed by the operating system 294 is transferred to the web page display component 26, a specific component of the operating system, for example, the web page display component execution environment, may intercept the system event, convert the system event into the custom web event, and then transfer the custom web event to the web page display component 26. That is, the event conversion operation in step S407 may alternatively be performed by a component of the operating system.

Step S409: The content extraction module 24 extracts, from the web page 2925 based on the web page coordinates included in the web event, content corresponding to the web page coordinates, where the extracted web page content includes but is not limited to a text, voice, a video, an image, a hyperlink, and the like. For specific implementation details of extracting the web page content by the content extraction module 24, refer to the following embodiment.

Step S411: The information feedback module 28 obtains the extracted content from the content extraction module 24, and transfers the extracted content to the operating system 294. The content extraction module 24 and the information feedback module 28 in a running mode run in a same execution environment of the web runtime. The information feedback module 28 may obtain the extracted web page content from the content extraction module 24, and then transfer the received web page content to the operating system 294. Because the information feedback module 28 runs in the web runtime 252, but the operating system runs in a system runtime 251, the information feedback module 28 and the operating system cannot directly communicate with each other. Therefore, the information feedback module 28 needs to invoke a library or a specific interface to transfer the extracted content to the operating system 294. In an embodiment, the content extraction module 24 and the information feedback module 28 are JS code or programs, and run in the script execution environment of the web runtime 252. For example, in a JS execution environment, the information feedback module 28 transfers the extracted web page content to a web page execution environment (page context) 253 using a JS binding mechanism, and the page context 253 invokes a specific interface, for example, an interface of the web runtime 252 and/or an interface of the web page display component 26, to transfer the extracted web page content to the system service 271 running in the system runtime.

Optionally, after web page content extraction is completed and the extracted content is transferred to the operating system, the web page content extraction method provided in this embodiment of this application further includes the following steps.

Step S413: Cancel the injected content extraction module 24 and the injected information feedback module 28. A cancellation process mainly includes removing the content extraction module 24 and the information feedback module 28 from the source code of the web page 2925 or the web runtime 252 through the interface of the web page display component 26.

Based on the web page content extraction method described in the foregoing embodiment, the following further describes related implementation details of each method step.

In step S401, the web page display component 26 of the application program 292 may be identified in a plurality of manners. In an embodiment, the operating system 294 may identify, using a static identification scheme, the web page display component 26 used by the application program 292 to load and display a web page. In the static identification scheme, web page display components used by a plurality of applications such as hot applications may be determined in advance through manual analysis or machine offline analysis, and a correspondence between an identifier of an application program and an identifier of a web page display component of the application program is stored using a preconfigured database or a data table. The identifier of the application program includes but is not limited to a name of the application program, an identifier of an installation package of the application program, signature information of the installation package of the application program, and the like. The identifier of the web page display component includes but is not limited to a name of the web page display component, signature information of the web page display component, and the like. In this case, the operating system 294 may search the preconfigured database based on an identifier of the application program 292 to obtain an identifier of a web page display component corresponding to the identifier of the application program 292, and further determine, based on the identifier of the web page display component from all controls included in the user interface of the application program 292, a control corresponding to the identifier of the web page display component. The determined control is the web page display component 26 of the application program 292. For example, if the identifier of the web page display component is the signature information of the web page display component, a control tree of the user interface 2923 may be traversed to determine a control whose signature information is the same as the signature information of the web page display component. The control is the web page display component used by the application program 292 to display a web page. The control tree is obtained by the operating system 294 after the operating system 294 parses the user interface 2923, and includes all controls in the user interface 2923. Signature information of each control may be obtained through decompilation.

In another embodiment, the operating system 294 may identify, using a dynamic identification scheme, the web page display component 26 used by the application program 292. Further, a function and/or behavior of one or more web page display components may be analyzed using a machine learning method, and a feature model of the web page display component is established. The feature model may represent a common feature of a plurality of web page display components. Further, the operating system 294 identifies, based on a feature of each control included in the user interface of the application program 292, a control that best matches the feature model of the web page display component. The feature of the control includes but is not limited to a function feature and a behavior feature. The function feature of the control represents a function attribute of the control, and includes an interface function feature used to describe or represent a function of an interface provided by the control. The behavior feature of the control indicates a feature of an operation or a command executed by the control, for example, an operation type or an operation object. The behavior feature of the control typically includes a rendering feature of the control, and the rendering feature represents a feature of a rendering operation performed by the control, for example, a drawing operation performed during rendering, drawing content, and drawing coordinates. The "executed operation/command" in this embodiment of this application includes at least one of an operation/command that has been executed, an operation/command that is being executed, or an operation/command that is to be executed. The following describes two specific examples of the dynamic identification scheme.

(1) Function model-based dynamic identification scheme: A same or similar function of a plurality of web page display components is analyzed and extracted using a manual or machine learning method, for example, interfaces that provide a same function, such as a page loading function interface, a history management interface, and an address navigation interface. A function model is established based on the extracted function to represent a necessary function of the web page display component. The necessary function includes but is not limited to a page loading function, a page refreshing function, a history management function, an address navigation function, and the like. Correspondingly, the operating system 294 may identify, from one or more controls included in the user interface 2923, a control whose interface function feature best matches the function model. The best matching control is the web page display component 26 of the application program 292. In the function model-based dynamic identification scheme, an interface attribute of each control, especially a view control, included in the user interface is analyzed.

(2) Rendering model-based dynamic identification scheme: A display list of one or more web page display components is analyzed using a manual or machine learning method. The display list includes a drawing operation that needs to be completed by the web page display component to render a web page, drawing content, drawing coordinates, and the like, and a rendering model is established based on this. The rendering model represents a feature of the drawing operation that needs to be completed to render the web page, and the feature includes but is not limited to a drawing manner, drawing content, drawing coordinates, and the like. The operating system 294 may analyze a display list of each control included in the user interface 2923, and identify a control whose rendering feature best matches the rendering model. The best matching control is the web page display component 26 of the application program 292.

It may be understood that the foregoing two dynamic identification schemes may also be combined. To be specific, a control whose function feature and rendering feature respectively match the function model and the rendering model may be identified based on both the function model and the rendering model. In this way, identification accuracy is higher.

Figure 5:
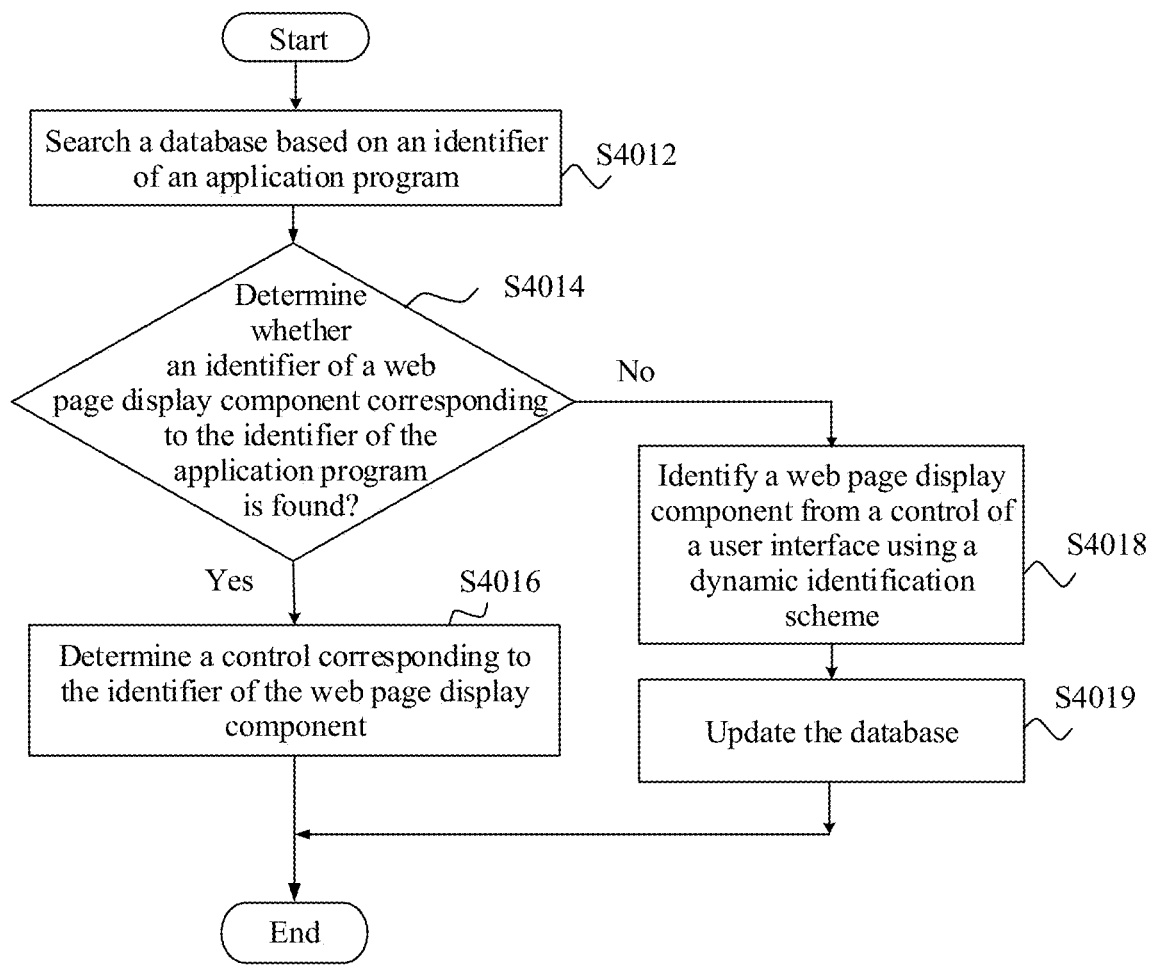
FIG. 5 is a flowchart of identifying a web page display component according to an embodiment of this application.

In an embodiment, the web page display component 26 used by the application program 292 to load and display a web page may also be identified by combining the static identification scheme with the dynamic identification scheme. Further, as shown in FIG. 5, along with FIG. 3, the operating system 294 may identify the web page display component 26 of the application program 292 by performing the following steps.

Step S4012: Search a database based on an identifier of the application program 292, where the database prestores a correspondence between an identifier of at least one application program and an identifier of a web page display component of the at least one application program.

Step S4014: Perform step S4016 if an identifier of a web page display component corresponding to the identifier of the application program is found, or perform step S4018 if an identifier of a web page display component corresponding to the identifier of the application program is not found.

Step S4016: Determine a corresponding control (namely, the web page display component of the application program 292) from a control of a user interface 2923 based on the found identifier, and end the identification procedure.

Step S4018: Identify the web page display component from a control of a user interface 2923 using a dynamic identification scheme.

Step S4019: Update the database, to be specific, establish a correspondence between the identifier of the identified web page display component and the identifier of the application program 292, add the correspondence to the database, and end the identification procedure.

After the identification procedure ends, procedures such as module injection, event distribution, information extraction, and information feedback shown in FIG. 4 may be performed. In an embodiment, in step S403, the operating system 294 may invoke the specific interface of the web page display component 26 to inject or add the code or the programs that implement functions of the content extraction module 24 and the information feedback module 28 into the source code of the web page 2925. For example, a JS object is added to <head> or <body> of the source code of the web page 2925 through a load interface, as shown below:

```
<html>
    <head>
        <script src="http file"></script>/*injected code->JS context
        execution*/
    </head>
    <body>
        <p>hello world</p>
        <script src="http file"></script>/*injected code->JS context
```

```
      execution*/
   </body>
</html>
```

Figure 6:
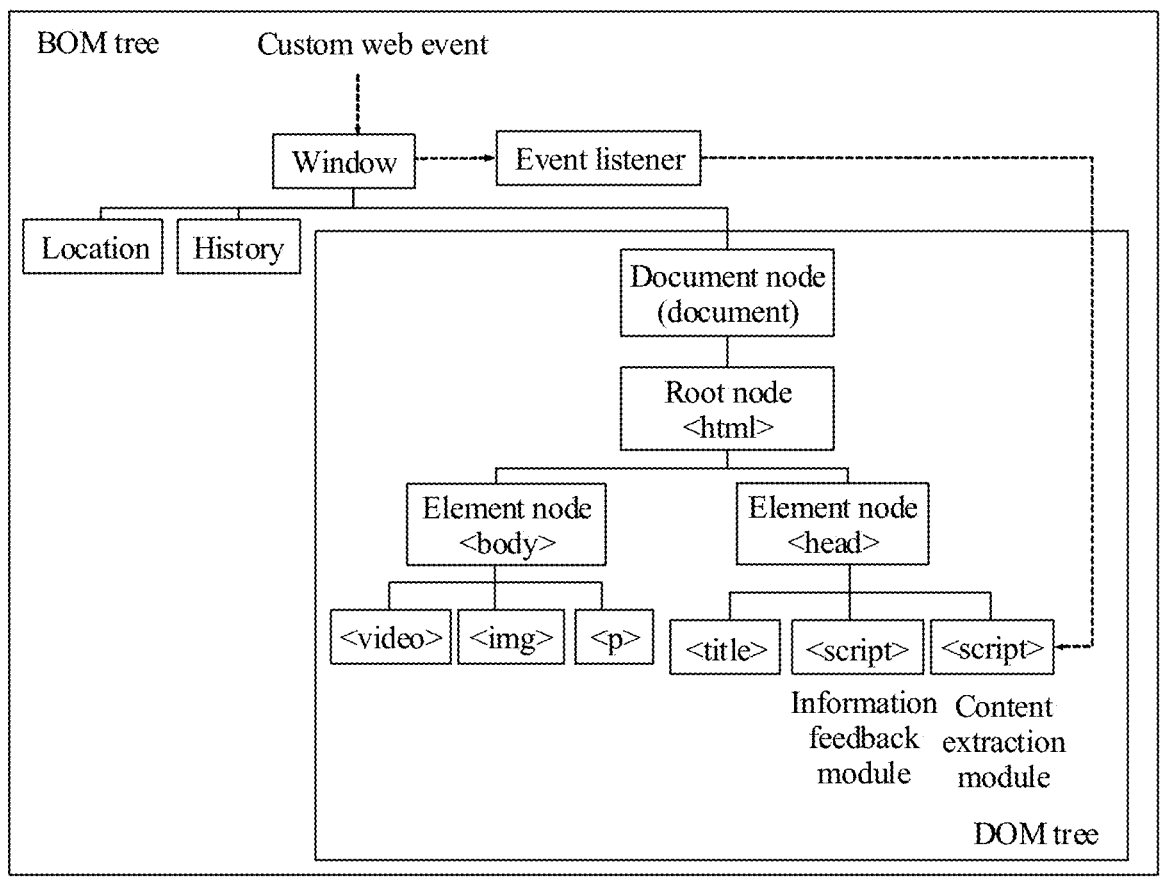
FIG. 6 is a schematic diagram of a DOM tree according to an embodiment of this application.

The page context 253 of the web runtime 252 parses the source code of the web page 2925 to obtain the code or the programs that implement the functions of the content extraction module 24 and the information feedback module 28, and the code or the programs are run by the script execution environment 255 to implement the web page content extraction function and the information feedback function. Further, the page context 253 parses the source code of the web page 2925 according to a DOM standard of the World Wide Web Consortium (W3C) to obtain a DOM tree of the web page 2925. As shown in FIG. 6, one DOM tree includes several nodes. The nodes are organized in a tree structure. An entire web page corresponds to one document node (document), each element on the web page corresponds to an element node, for example, a video (<video>), an image (<img>), or a paragraph (<P>), and <html> is a root node of all nodes. After the source code of the web page 2925 is parsed by the page context 253, the injected content extraction module 24 and the injected information feedback module 28 are located below an element node such as <head> or <body> of the DOM tree of the web page 2925. It should be understood that the content extraction module 24 and the information feedback module 28 in a static mode are code or executable programs written in a programming language. After being parsed and executed by the web runtime 252, the code implements the web page content extraction function and the information feedback function. The content extraction module 24 and the information feedback module 28 in the running mode are threads or processes, and the content extraction module 24 and the information feedback module 28 may be different threads or processes, or may be a same thread or process.

In another embodiment, the operating system 294 may invoke the specific interface of the web page display component 26 to directly transfer the code or the executable programs that implement the functions of the content extraction module 24 and the information feedback module 28 to the script execution environment 255 corresponding to the web page 2925 for execution, to implement the web page content extraction function and the information feedback function.

As described in step S407 and step S409, the content extraction module 24 triggers execution of the web page content extraction operation based on the custom web event. The root node of the BOM tree corresponding to the web page 2925 is the window node (window). As shown in FIG. 6, the entire DOM tree of the web page 2925 may be considered as a subnode of the window node. The custom web event distributed by the web page display component 26 starts to be transferred from the window node to a target node of the DOM tree, and the target node is determined based on the web page coordinates carried in the custom web event. In an embodiment, an event listener may be registered on the window node, and is specially configured to listen to the custom web event. When the custom web event is transferred to the window node, the event listener obtains the custom web event through listening and triggers the content extraction module 24 to perform the web page content extraction operation. In another embodiment, an event listener may be registered on a root node of the DOM tree or another node in a transfer path of the custom web event, for example, a body node, to trigger, based on the custom web event obtained through listening, the content extraction module to complete content extraction. Optionally, to reduce interference to normal processing logic of a web page, after the event listener obtains the custom web event through listening and triggers the content extraction module 24 to perform the web page content extraction operation, the event listener may prevent the web event from being further transferred. Further, after web page content extraction is completed, the event listener may be cancelled.

In an embodiment, an occasion for injecting the content extraction module 24 and the information feedback module 28 in step S403 is related to an injection policy. An optimal injection policy is on-demand injection. To be specific, the content extraction module and the information feedback module are injected only when content of a web page needs to be extracted such that impact on the web page can be minimized. However, in some cases, limited by interfaces of some web page display components, the injected information feedback module cannot function in an execution environment of a currently displayed web page, and is only effective in an execution environment of a subsequent to-be-loaded web page. Therefore, the information feedback module needs to be injected before the web page is loaded, and the information feedback module resides in page logic after being injected. When no web page content needs to be extracted, the information feedback module injected in advance is in a standby mode. When web page content needs to be extracted, the content extraction module triggers the information feedback module to work, and the information feedback module is restored to the standby mode after completing work. In this case, on-demand injection of the content extraction module and the information feedback module cannot be supported, and only a suboptimal injection policy can be supported. To be specific, the content extraction module and the information feedback module are injected in different stages. Therefore, the operating system 294 first determines an injection policy supported by the web page display component 26 of the application program 292, and then performs a module injection operation. The operating system 294 may determine, when the application program 292 is being installed, the injection policy supported by the web page display component 26 of the application program 292, and record the injection policy in the database, or may determine the injection policy when the user interface 2923 of the application program 292 is being created. Similar to the foregoing process of identifying the web page display component of the application program, the operating system 294 may determine, in a static manner or a dynamic manner, the injection policy corresponding to the application program 292.

In the static manner, whether on-demand injection is supported by a plurality of web page display components, for example, web page display components of a plurality of hot applications, is determined in advance through a manual test or a machine offline test, an injection policy supported by each web page display component is further determined, and then a correspondence between an identifier of a web page display component and an injection policy is stored in the database or the data table. In this case, the identifier of the web page display component 26 may be first determined based on the identifier of the application program 292 (refer to the static identification scheme in step S401), and then the database or the data table is searched based on the identifier of the web page display component 26 to determine the injection policy supported by the web page display component 26. It may be understood that a mapping relationship among an identifier of an application program, an identifier of a web page display component used by the application program, and an injection policy supported by the web page display component may also be prestored in a same database or data table. In this way, the identifier and the corresponding injection policy of the web page display component of the application program can be quickly found using the identifier of the application program. This is more efficient, and is convenient for database maintenance.

In the dynamic manner, whether a web page display component supports the optimal injection policy may be determined using a function feature of an open interface of the web page display component.

In an embodiment, an injection policy may also be determined by combining the static manner with the dynamic manner. To be specific, when an injection policy corresponding to a web page display component cannot be found from the database, an interface function feature of the web page display component is used to determine whether the web page display component supports the optimal injection policy.

Figure 7A:
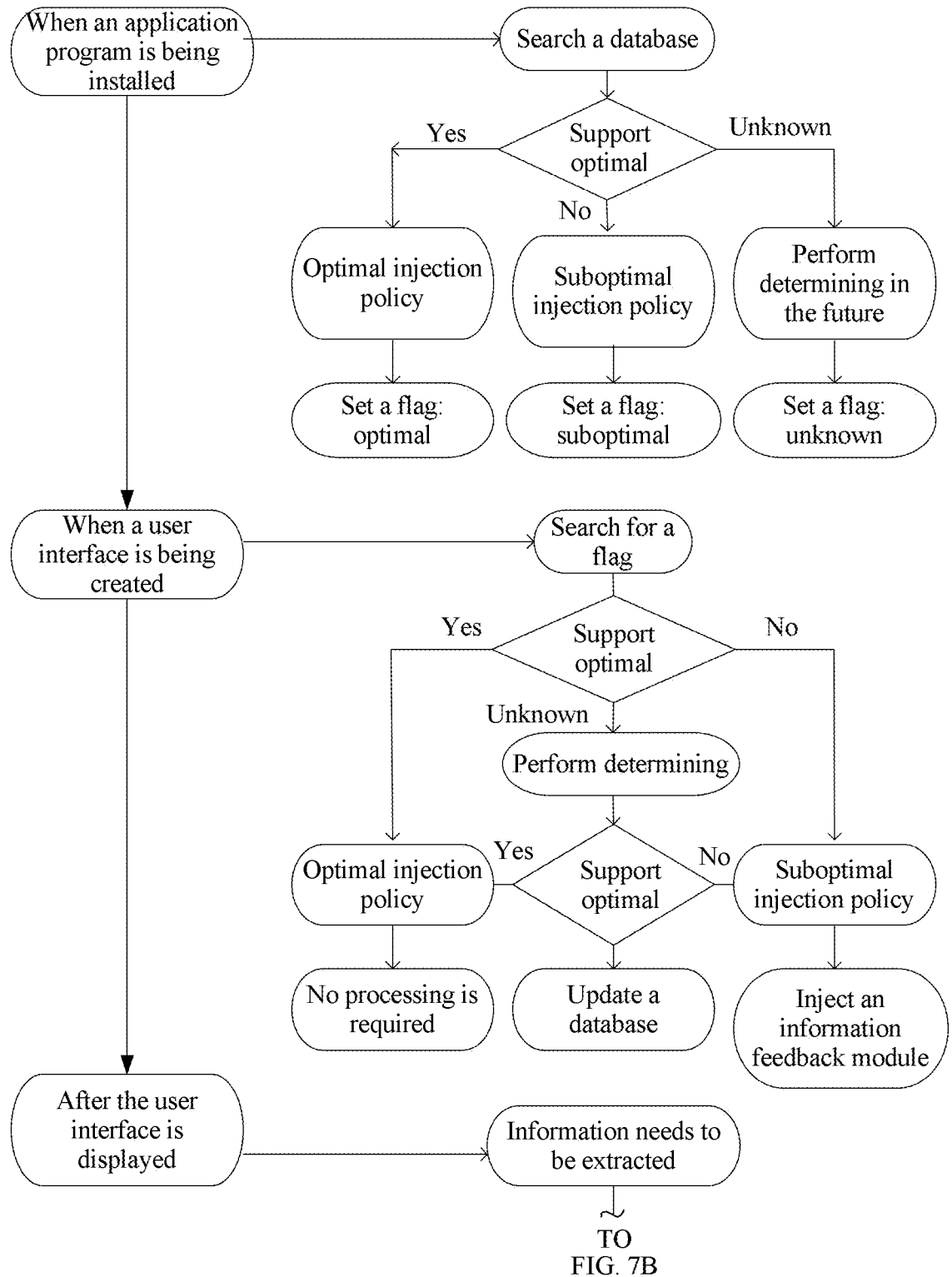
FIG. 7A and FIG. 7B show a flowchart of a process of injecting a content extraction module and an information feedback module according to an embodiment of this application.
Figure 7B:
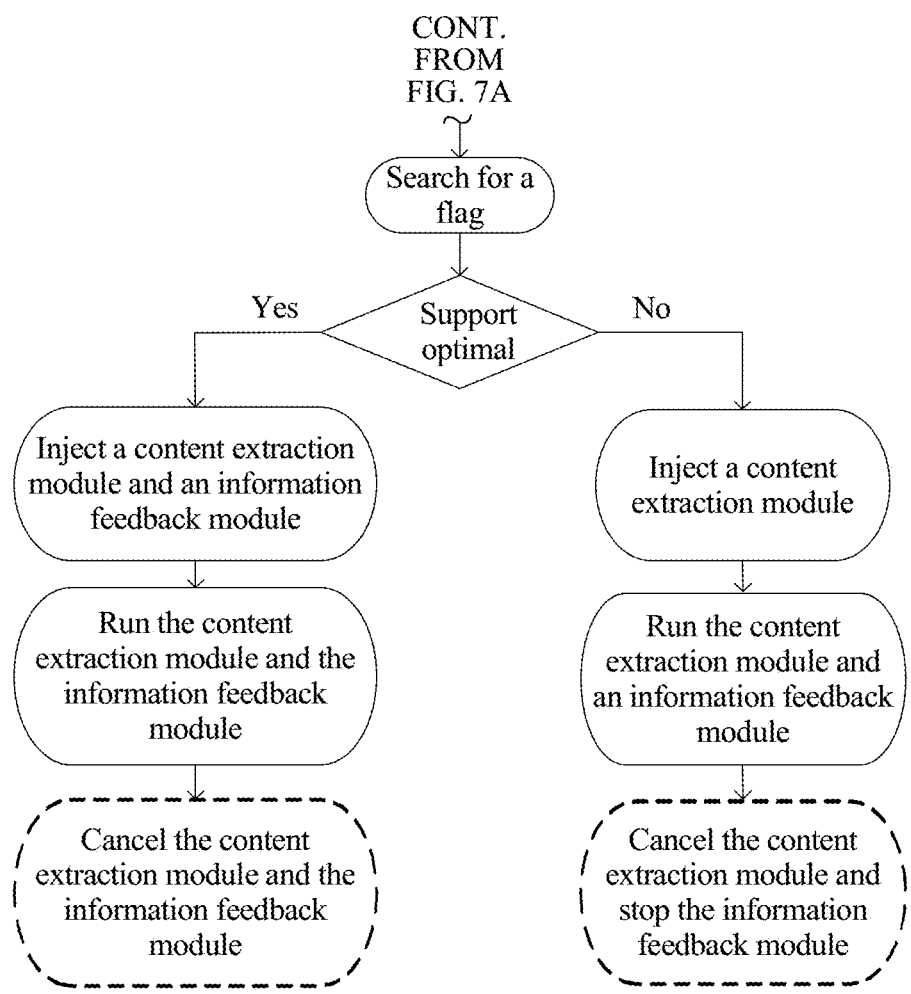

FIG. 7A and FIG. 7B show an example of a process of injecting a content extraction module and an information feedback module. As shown in FIG. 7A and FIG. 7B, when an application program is being installed, a database may be searched based on an identifier of the application program to determine an injection policy corresponding to a web page display component of the application program. If the injection policy corresponding to the web page display component of the application program cannot be found from the database based on the identifier of the application program, that is, when the injection policy is unknown, the injection policy may be determined in a dynamic manner, or may not be determined temporarily, and remains to be determined in a subsequent phase.

Optionally, to quickly learn of the injection policy of the application program during subsequent processing, a corresponding flag may be set to identify the injection policy of the application program. For example, if the injection policy is optimal, the flag is set to "1", or if the injection policy is suboptimal, the flag is set to "0", or if the injection policy is unknown, the flag is set to "01".

Further, when a user interface of the application program is being created, the flag of the application program is searched for, and the injection policy supported by the web page display component of the application program is determined based on the flag of the application program. If an optimal injection policy is supported, it indicates that the content extraction module and the information feedback module may be injected on demand, and therefore a module injection operation does not need to be performed currently. If a suboptimal injection policy is supported, the web page display component of the application program is identified using the identification method described in the foregoing embodiment, and then the information feedback module is injected through an interface of the identified web page display component. If the injection policy is unknown, the injection policy is determined in the dynamic manner, and the database is updated to add a correspondence between an identifier of the web page display component and the determined injection policy to the database. To enable the suboptimal injection policy to be compatible with the optimal injection policy, flag search is completed in an oncreate phase of an activity of the application program, the web page display component is generated in this phase, and a web page has not been loaded.

After the user interface of the application program is displayed, if there is a web page content extraction requirement, the flag of the application program is searched for, and if the flag indicates the optimal injection policy, the web page display component of the application program is identified using the identification method described in the foregoing embodiment, and the content extraction module and the information feedback module are simultaneously injected through the interface of the identified web page display component, or if the flag indicates the suboptimal injection policy, the content extraction module is injected. The web page content extraction requirement may be triggered by a user, or may be automatically triggered by an operating system.

Optionally, after web page content extraction is completed, if the injection policy is optimal, the content extraction module and the information feedback module are cancelled, or if the injection policy is suboptimal, the content extraction module is cancelled, and the information feedback module is stopped.

In step S409, the content extraction module 24 traverses a DOM tree of the web page 2925 based on location information (web page coordinates) carried in the web event, and determines, through a coordinate collision test, a target node or an element corresponding to the location information, to further extract content corresponding to the target node. The target node may be a paragraph of text or an image. The method for determining the target node through the coordinate collision test based on the web page coordinates is a technology well known by a person skilled in the art, and related implementation details are not described in this embodiment of this application.

In an embodiment, the content corresponding to the target node may be associated with content of a node around the target node. For example, if a display attribute of the target node is inline-block (i.e., display=inline-block) or a display attribute of an adjacent node of the target node is inline-block, it indicates that the content corresponding to the target node and content corresponding to the adjacent node of the target node are combined and displayed as a whole. For example, two paragraphs of text are combined into one paragraph of text for display (the user sees one paragraph of text, but this paragraph of text is actually corresponding to two nodes). In this case, the content extraction module 24 simultaneously extracts the content corresponding to the target node and the content corresponding to the adjacent node of the target node.

In an embodiment, the content corresponding to the target node may include a large quantity of space characters such that the content corresponding to the target node is displayed as two parts. For example, word wrap is caused because a paragraph includes a relatively large quantity of space characters, and the user sees two paragraphs of text. In this case, the content extraction module 24 determines whether a quantity of space characters included in the content corresponding to the target node is greater than a specified threshold, and if the quantity is greater than the specified threshold, some content before the space character in the content corresponding to the target node or some content after the space character in the content corresponding to the target node is extracted. It may be understood that the threshold herein is related to a quantity of characters in single-line content displayed on the web page. For example, the threshold may be equal to or close to the quantity of characters included in the single-line content.

In an embodiment, if a quantity of characters included in the content corresponding to the target node is greater than a specified threshold, for example, a large paragraph of text, the content extraction module 24 may extract only a part of the content, for example, characters with a specified length that are close to the web page coordinates in the content corresponding to the target node. The web page coordinates are carried in the web event.

In the foregoing solution in this embodiment of this application, the operating system dynamically identifies the web page display component used by the application, injects, into the web page on a proper occasion through the interface of the identified web page display component, the modules used for content extraction and information feedback, triggers, using the custom system event, the content extraction module to extract content at a specified location on the web page, and transfers the extracted web page content to the operating system using the information feedback module. It can be learned that an entire web page content extraction process is perception-free for an application and does not depend on a function of the application, and therefore various types of applications can be compatible. In addition, a content extraction process and a feedback process are triggered based on the custom system event and the web event, thereby avoiding impact on performance and logic of the system, the application program, and the page. Further, based on the web page content extracted by the content extraction module 24, data mining may be performed to create a user portrait or implement various intelligent recommendation services. For example, when the extracted web page content is a text, one or more keywords may be determined from the extracted text, and then the keyword is displayed, or content is pushed to the user or a commodity, a service, or the like is recommended based on the keyword. Web page content such as a text, voice, a video, an image, or a uniform resource locator (URL) address extracted by the content extraction module 24 may also be used as a data sample for deep learning training in artificial intelligence.

It should be noted that in some application scenarios, alternatively, the application program 292 may implement the web page content extraction method described in the foregoing embodiment, to extract the content of the web page 2925 embedded in the user interface 2923 of the application program 292. A main difference between implementing the foregoing method by the application program 292 and implementing the foregoing method by the operating system 294 lies in that the application program 292 does not need to identify the web page display component 26 of the application program 292. For the application program 292, because the web page display component used by the application program 292 is already determined during development, the application program 292 can perceive the web page display component used by the application program 292. For the operating system 294, a relatively large quantity of application programs are installed on the terminal device 200 and different application programs may use different web page display components, some applications use a native web page display component of the operating system, and some applications use a private web page display component or a third-party web page display component. Therefore, it is very difficult for the operating system 294 to directly determine the web page display component 26 used by the application program 292. The identification of the web page display component of the application program 292 needs to be completed by performing step S401 in the foregoing embodiment, and then a module injection operation and a content extraction operation are performed.

In an embodiment, after the web page display component 26 of the application program 292 loads and displays the web page 2925, the content extraction module 24 and the information feedback module 28 are injected into the web page 2925 through the specific interface of the web page display component, and then the web event is triggered based on operation behavior or an operating status of the user, for example, an operation (for example, tapping or dragging) performed by the user on an element or an area on the interface, or the web event is triggered when the user performs no operation after the preset duration. The content extraction module 24 performs the content extraction operation after the web event is obtained through listening, and the information feedback module 28 feeds back the extracted content to the application program. For related implementation details of module injection, content extraction, and information feedback, refer to the foregoing embodiment. Details are not described again. Optionally, the application program may further select a plurality of keywords from the extracted content, and then push the content to the user or recommend a commodity, a service, or the like based on one or more keywords.

In another embodiment, the application program 292 may implement the web page content extraction method described in the related embodiment in FIG. 4, to extract web page content on an interface of another application program (referred to as a "target application" below). The application program 292 and the target application may be independent third-party applications or may be associated applications, for example, applications developed by a same company, applications developed based on a same software develop kit, or applications that have a similar function. Further, the application program 292 may identify, using the identification method described in step S401, a web page display component used by the target application, and then inject the content extraction module and the information feedback module into a web page on the interface of the target application through an interface of the web page display component of the target application. After running in the web runtime, the injected modules implement the web page content extraction function and the information feedback function. The content extraction module triggers the web event based on operation behavior or an operating status of the user, and extracts content corresponding to specified coordinates from the web page on the interface of the target application. The information feedback module transfers the extracted content to the application program 292, to implement cross-application web page content extraction. For related implementation details of web page display component identification, module injection, content extraction, and information feedback, refer to the foregoing embodiment. Details are not described again. Optionally, the application program 292 may further select a plurality of keywords from the extracted content, and then push the content to the user or recommend a commodity, a service, or the like based on one or more keywords.

In some special cases, for example, some application programs use a special web page display component. The special web page display component exposes no interface or function externally, and therefore it is difficult for the operating system to identify the special web page display component. In addition, because no interface is exposed, the content extraction module and the information feedback module cannot be injected through the interface of the special web page display component. In view of this, an embodiment of this application further provides another web page content extraction method, and web page content is extracted using a display list. Further, an operating system establishes and maintains the display list when rendering a user interface of an application program. The display list is a buffer, and a sequence of to-be-performed drawing operations is recorded in the display list. The drawing operations are finally converted into graphics commands, and the graphics commands are executed by a GPU or the operating system using a graphics processing software library, to draw the user interface of the application program. A drawing operation includes at least drawing content (what to draw) and drawing coordinates (where to draw). When content at a first location on the web page needs to be extracted, the operating system identifies, from the display list based on web page coordinates corresponding to the location, a drawing operation whose drawing coordinates correspond to the web page coordinates, and extracts drawing content of the drawing operation as target content. The drawing operation whose drawing coordinates correspond to the web page coordinates may be a drawing operation whose drawing coordinates are the same as the web page coordinates, and/or a drawing operation whose drawing coordinates are at a distance in a preset range from the web page coordinates.

In an embodiment, the web page coordinates correspond to a location of a current operation of a user. For example, the user taps or selects the content at the first location on the web page. In another embodiment, the web page coordinates may be specified by the operating system. For example, if the user is perception-free, the operating system distributes a custom system event to trigger web page content extraction. The system event carries the web page coordinates or system coordinates corresponding to the web page coordinates. In an embodiment, a web page display component execution environment of the operating system may perform the foregoing web page content extraction operation. After completing web page content extraction, the web page display component execution environment feeds back the extracted content to a system service. The web page display component execution environment runs in a system runtime.

It should be noted that the aforementioned web page content extraction method based on the display list may be implemented independently, or may be implemented in combination with the method described in the related embodiments in FIG. 4 to FIG. 7A and FIG. 7B. For example, when the web page display component of the application program cannot be identified by the static identification scheme or the dynamic identification scheme, the foregoing web page content extraction scheme based on the display list is used to implement web page content extraction.

In an embodiment, the web page content extraction method provided in this embodiment of this application is implemented using code. The code is included in the operating system, and is provided for the user as a feature of the operating system. Optionally, the system may provide a switch for the user, and the user may choose to enable or disable the feature. When the user enables the feature, the operating system may trigger web page content extraction based on triggering by the user or automatically trigger web page content extraction.

Figure 8:
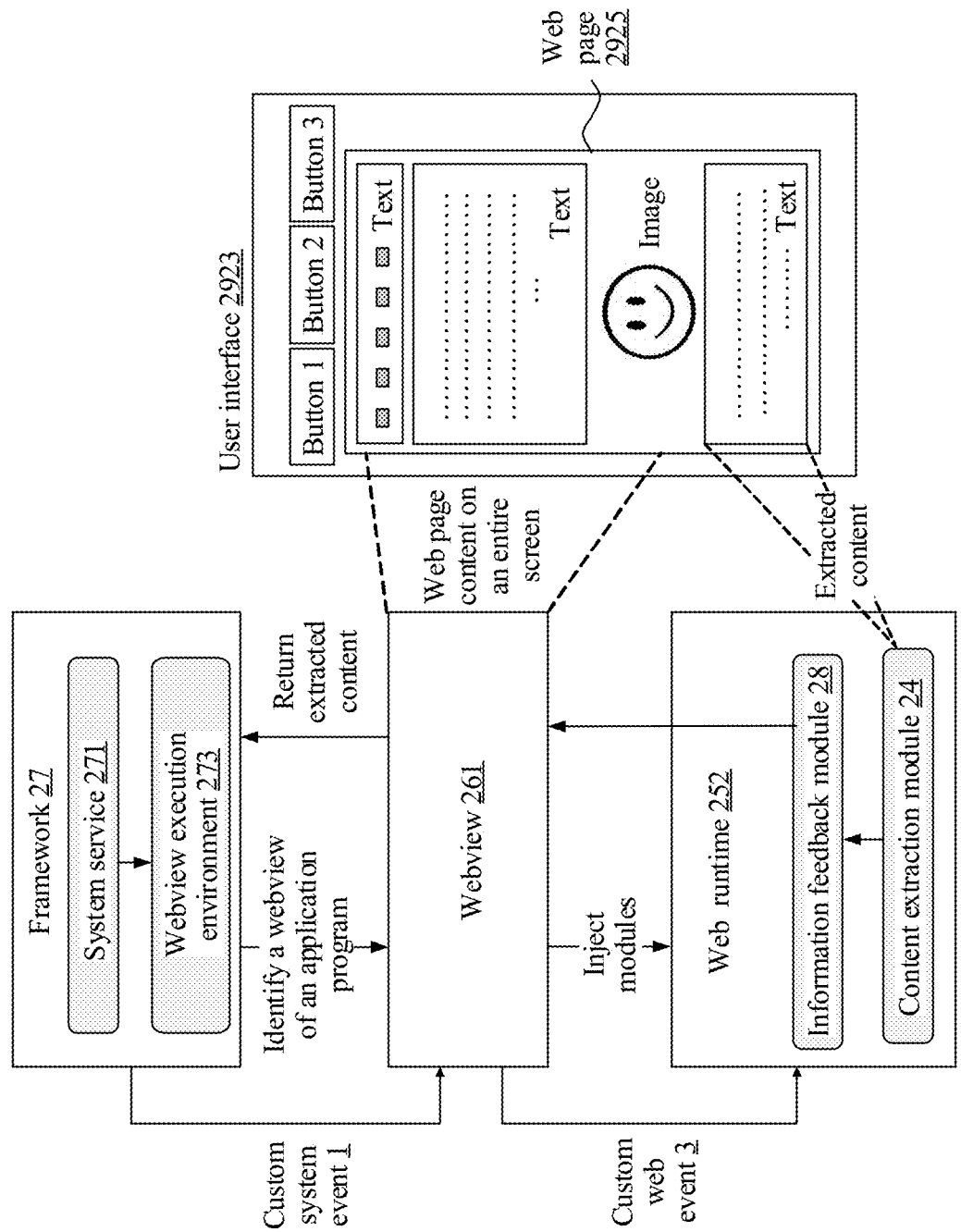
FIG. 8 is a schematic diagram of a process of a web page content extraction method according to an embodiment of this application.

FIG. 8 shows a process in which a terminal device 200 running an ANDROID system implements the web page content extraction method described in the foregoing embodiment. An application program based on the ANDROID system usually loads and displays a web page using an inherent webview of the ANDROID system or a third-party webview. The webview runs in a webview execution environment (webview context) 273 in a framework 27 of the ANDROID system, and a system service 271 in the framework 27 drives the webview context 273 to complete a control layout and control rendering of a user interface 2923. The user interface 2923 is usually an activity, and includes a plurality of controls. Some of the controls are view controls, for example, <Textview>, <ImgView>, and <VideoView>. The webview is also a view control. If a web page 2925 is embedded in the user interface 2923, the user interface includes the webview configured to load and display the web page. The webview context 273 identifies a webview 261 from a view control of the user interface 2923 using the identification method in step S401 in the related embodiment in FIG. 4, and then invokes an interface of the webview 261 to inject a content extraction module 24 and an information feedback module 28 into the web page. The injected content extraction module 24 and the injected information feedback module 28 run in a JS execution environment of a web runtime 252. An occasion for injecting the content extraction module 24 and the information feedback module 28 is related to an injection policy supported by the webview 261. For specific implementation details, refer to the foregoing embodiment.

When content of the web page needs to be extracted, the system service 271 distributes a custom system event 1 to the webview 261. As described in step S405, the custom system event 1 may be triggered based on a user operation, or may be simulated by the system. After receiving the custom system event 1, the webview 261 converts the custom system event 1 into a custom web event 3, and transfers the custom web event 3 to a window node of a BOM tree of the user interface 2923. The content extraction module 24 may register an event listener on the window node. After obtaining the custom web event 3 through listening, the event listener triggers the content extraction module 24 to extract content at a specified location on the web page. The specified location is indicated by coordinate information carried in the custom web event 3. Optionally, before the custom system event 1 is transferred to the webview 261, another component such as the webview context 273 of the operating system may intercept the custom system event 1, convert the custom system event 1 into the custom web event 3, and then transfer the custom web event 3 to the webview 261. That is, the event conversion operation may not be performed by the webview 261.

Further, the content extraction module 24 transfers the extracted content to the information feedback module 28. The information feedback module 28 transfers the extracted content to a web page execution environment (page context) of the web runtime 252 using a JS binding mechanism. The page context transfers, through a JNI and/or an inter-process communication mechanism (for example, a binder, a pipe, or a socket), information to the system service 271 that runs in a system runtime or another system component in the framework 27. In this case, a web page content extraction process is completed.

The system service 271 or the other system component in the framework 27 may perform data mining based on the web page content extracted by the content extraction module 24, to create a user portrait or implement various intelligent recommendation services. For example, one or more keywords may be determined from the extracted web page content, and then the keyword is displayed, or content is pushed to the user or a commodity, a service, or the like is recommended based on the keyword. Alternatively, content such as voice, a video, an image, or a hyperlink on a web page may be extracted, to mine data of the user.

Figure 9:
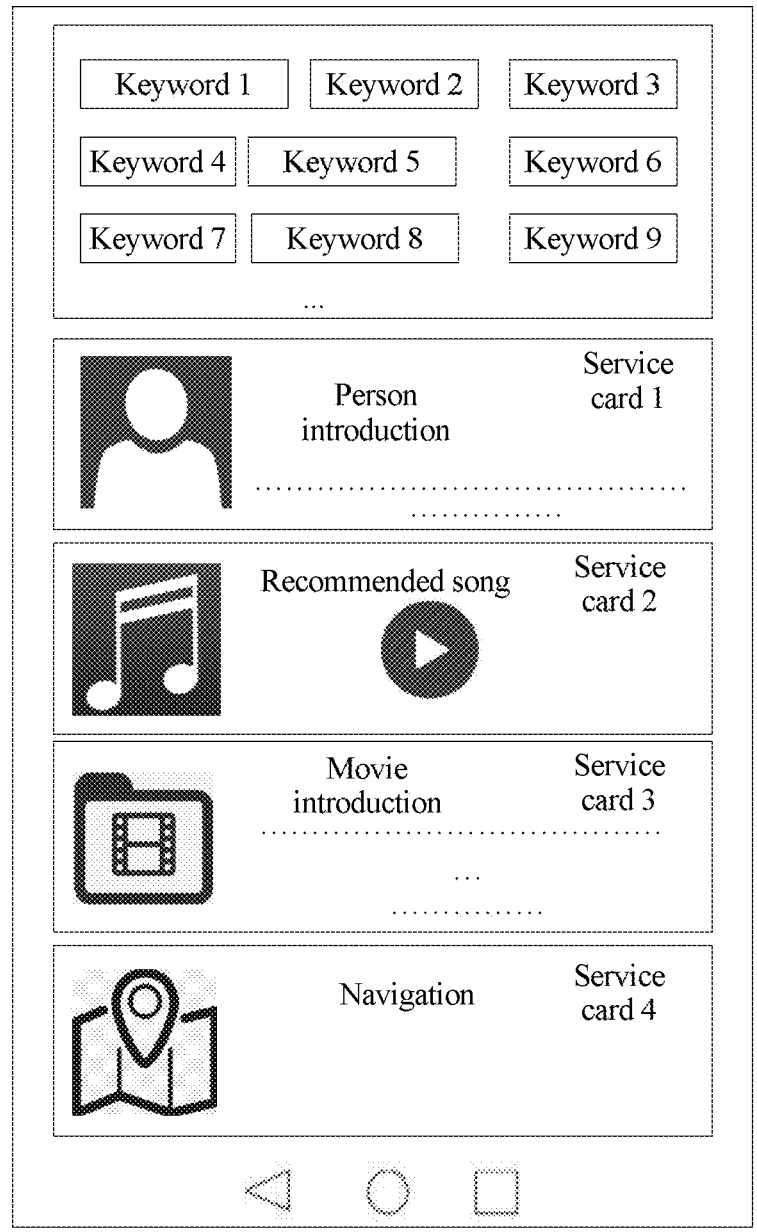
FIG. 9 is a schematic diagram of performing intelligent service recommendation based on extracted web page content according to another embodiment of this application.

In an embodiment, as shown in FIG. 9, the operating system (the system service 271 or the other system component in the framework 27) may display, in a specific area on a screen of the terminal device 200, the keyword in the web page content extracted by the content extraction module 24 such that the user browses the keyword. The displayed keyword includes but is not limited to a person name, a place name, a commodity name, a movie name, a technical term, and the like. Further, the operating system may generate one or more intelligent service cards based on the one or more keywords, and the intelligent service card is used to present recommended content, commodities, and services to the user. The recommended content includes but is not limited to a song, a movie, an electronic book, a character introduction, a scenic spot introduction, and the like. The commodity includes but is not limited to a commodity that is on sale on an e-commerce website. The service includes but is not limited to navigation, ticket booking, hotel booking, translation, and the like. By operating the intelligent service card, the user may quickly obtain content, commodities, and services in which the user is interested. Optionally, the user may select, from the displayed keyword, a keyword in which the user is interested, for example, may tap a keyword. Based on a keyword selection operation performed by the user, the operating system performs more pertinent recommendation based on the keyword selected by the user. Web page content such as a text, voice, a video, an image, or a URL address extracted by the content extraction module 24 may also be used as a data sample for deep learning training in artificial intelligence.

In an embodiment, the web page content extraction method provided in this embodiment of this application and an intelligent service recommendation method implemented based on the extracted web page content may be implemented using code, and the code is provided for the user as a feature of the operating system. When the user enables the feature, the operating system may trigger web page content extraction based on triggering by the user or automatically trigger web page content extraction, and perform service recommendation. In another embodiment, the web page content extraction method provided in this embodiment of this application and an intelligent service recommendation method implemented based on the extracted web page content may be implemented using code, and the code is encapsulated as an application programming interface (API) and opened to an upper-layer application program. The application program invokes the API to implement web page content extraction and intelligent service recommendation. For example, an application program may invoke the API to extract web page content included in a user interface of another application program, to implement cross-application web page content extraction.

Figure 10:
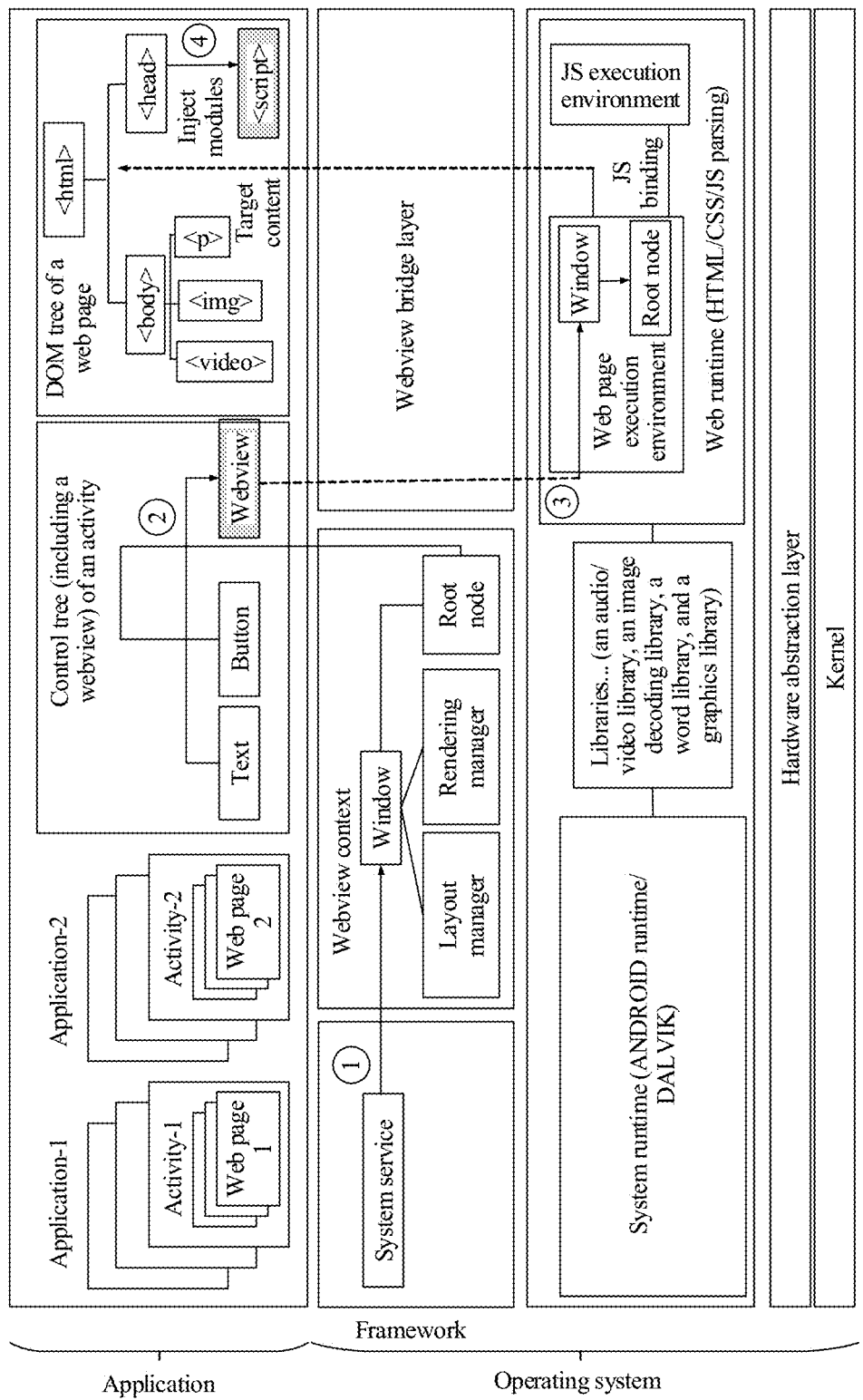
FIG. 10 is a schematic diagram of a process of a web page content extraction method according to another embodiment of this application.

FIG. 10 shows a more detailed process in which a terminal device 200 running an ANDROID system implements the web page content extraction method described in the foregoing embodiment.

As shown in a process ① in FIG. 10, a system service in a framework of an operating system drives a webview execution environment (webview context) to complete a control layout and control rendering of an activity of an application program. The activity may also be considered as a user interface. The webview context includes a layout manager and a rendering manager. In an oncreate phase of a lifecycle of the activity, the layout manager parses a layout file of the activity, to construct, as a control tree of the activity, a view control included in the activity. A webview control corresponding to a web page embedded in the activity is also included in the control tree. The rendering manager is configured to implement rendering of a control of the activity, that is, draw the control in a display area. Because the operating system cannot directly perceive a webview of a third-party application, the layout manager of the webview context traverses the control tree of the activity, and identifies the webview from the control tree of the activity using the identification method described in step S401 in the foregoing embodiment, as shown in a process ②. A web page execution environment (page context) corresponding to the web page may be further determined using the webview (a process ③). Then the webview context may invoke an open interface of the webview, for example, addJavascriptInterface, evaluateJavaScript, or, load or inject a content extraction module and an information feedback module into source code or a JS execution environment of the web page, as shown in a process ④. The injected modules are JAVA code or programs implemented in a JS language. After being run in the JS execution environment, the injected modules implement a web page content extraction function and an information feedback function. A window node of the activity in which the web page is located is a root node of a web event. When any DOM node of the web page is tapped, the web event starts to be transferred from the window node. Therefore, an event listener may be registered on the window node or another node in a transfer path of the web event, and is specially responsible for listening to a custom web event that is used to trigger web page content extraction. After obtaining the custom web event through listening, the event listener prevents the event from being further transferred, and triggers the content extraction module to extract corresponding content from the web page based on web page coordinates carried in the custom web event.

It can be learned that a straight-through link between the system service and the web page is established in the foregoing processes ①, ②, ③, and ④. The content extraction module and the information feedback module run in the JS execution environment. The content extraction module transfers the extracted web page content to the information feedback module, and triggers a non-built-in callback in the JS execution environment. The information feedback module listens to and intercepts the non-build-in callback, and transfers the extracted web page content to the page context using a JS binding mechanism. The page context feeds back the extracted web page content to the system service in the framework of the operating system through a JNI and the foregoing straight-through link.

An occasion for identifying the webview and an occasion for injecting the content extraction module and the information feedback module are related to an injection policy supported by the webview of the application program. When the application program is being installed, whether the application program is in a hash database that supports "on-demand" injection may be determined based on an identifier of an installation package of the application program. If the application program is in the hash database, a related flag of the application program is set to indicate that an optimal injection policy is supported, and it indicates that the content extraction module and the information feedback module may be injected on demand. For an application program that is not in the hash database, a related flag is set to indicate that the optimal injection policy is not supported temporarily, and whether the optimal injection policy is subsequently supported is determined at a proper occasion. If the optimal injection policy is supported, the hash database is updated, or if the optimal injection policy is not supported, the related flag is set to indicate that a suboptimal injection policy is supported.

Further, in the oncreate phase of the lifecycle of the activity of the application program, an injection policy corresponding to the flag of the application program is determined by searching for the flag of the application program, and an instance of the webview is generated in this phase, but the web page is not loaded temporarily. If the application program supports the optimal injection policy, a webview identification operation and a module injection operation do not need to be performed in this phase. If the application program supports the suboptimal injection policy, in this phase, the layout manager parses the layout file of the activity and constructs the control tree of the activity to complete webview identification, and injects the information feedback module through an interface of the identified webview. The module is valid only for a to-be-loaded web page.

After the activity of the application program is displayed, if page information needs to be extracted, for an application program that supports the optimal injection policy, the instance of the webview is identified using the identification method described in step S401 in the foregoing embodiment, and the content extraction module and the information feedback module are injected through the interface of the webview. The injected modules function only on a page that has been loaded and displayed by the webview, and after web page content extraction and information feedback are completed, the two modules may be directly cancelled to implement on-demand injection and web page content extraction. For the application program that supports the optimal injection policy, the content extraction module is injected through the interface of the webview. The information feedback module has been injected in the oncreate phase of the activity.

In an embodiment, the operating system distributes a custom (user-triggered or system-simulated) system event to the webview, and the system event includes coordinates defined using an ANDROID coordinate system. The webview encapsulates the system event as a web event, and converts system coordinates into web page coordinates. The web event triggers the content extraction module to extract content corresponding to the web page coordinates. Optionally, before the custom system event is transferred to the webview, another component of the operating system may intercept the custom system event, and encapsulate the custom system event as a custom web event. The custom web event includes the web page coordinates obtained after the conversion. In addition, the event listener listens only to the custom web event. After the custom web event is obtained through listening, the content extraction module completes content extraction based on the web page coordinates carried in the event. Therefore, normal event processing logic of the web page is not affected, and impact of an entire page content extraction procedure on the page is minimized as far as possible.

Figure 11:
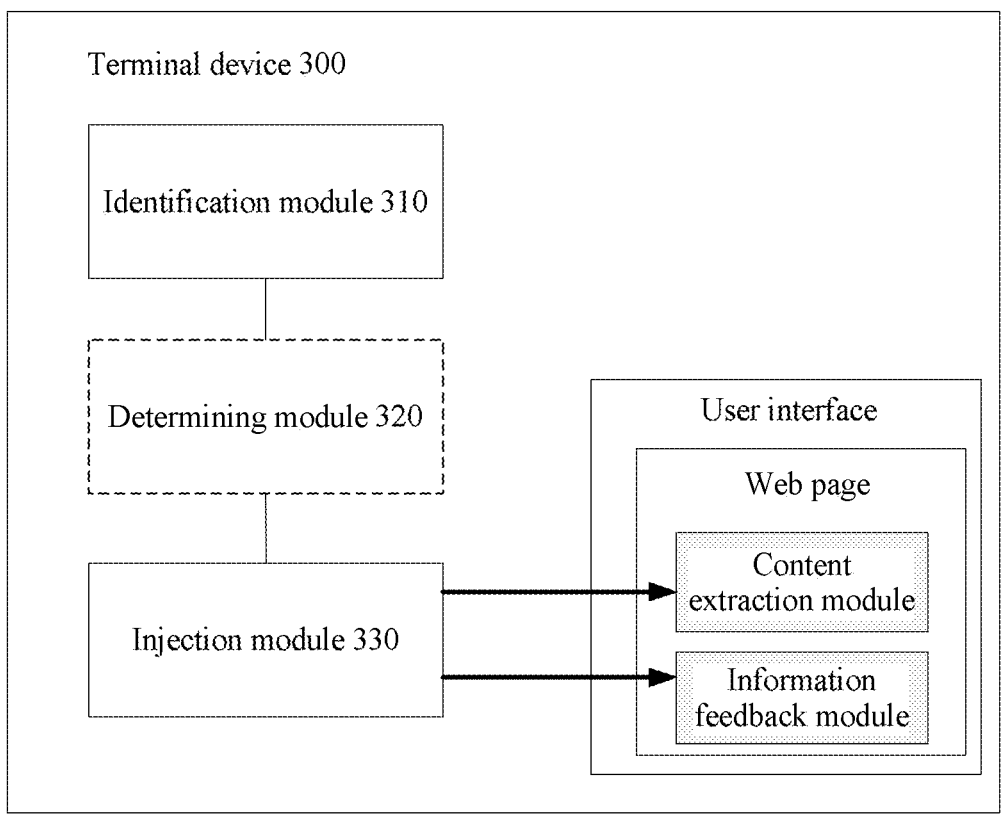
FIG. 11 is a schematic structural diagram of a terminal device according to another embodiment of this application.

Based on the web page content extraction method described in the foregoing embodiment, an embodiment of this application further provides a terminal device 300. As shown in FIG. 11, the terminal device 300 includes an identification module 310 and an injection module 330. The identification module 310 is configured to identify a web page display component of an application program. The web page display component is configured by the application program to load and display a web page included in a user interface. The injection module 330 is configured to inject a content extraction module and an information feedback module into the web page through an interface of the web page display component. For specific working processes of the identification module 310 and the injection module 330, respectively refer to the related implementation details of steps S401 and S403 in the foregoing method embodiment. For specific working processes of the content extraction module and the information feedback module, respectively refer to the working processes of the content extraction module 24 and the information feedback module 28 described in the foregoing embodiment.

In an embodiment, the terminal device 300 further includes a determining module 320 configured to determine an injection policy. The injection policy is related to an occasion for injecting the content extraction module and the information feedback module. The injection policy includes an optimal injection policy and a suboptimal injection policy. In this embodiment of this application, a first policy is used to represent the optimal injection policy, and a second policy is used to represent the suboptimal injection policy. The determining module 320 may determine the injection policy when the application program is being installed or when the user interface of the application program is being created. For specific implementation details of determining the injection policy by the determining module 320, refer to the related descriptions of step S403 in the foregoing embodiment.

In this embodiment of this application, the identification module 310, the determining module 320, and the injection module 330 may be implemented by a proper combination of software, hardware, and/or firmware of the terminal device 300, for example, one or more software modules implemented using a computer program. The software modules may be included in an operating system, or may be invoked by an operating system or an application program as independent components. In another embodiment, the identification module 310, the determining module 320, and the injection module 330 may be a processor, and functions of the identification module 310, the determining module 320, and the injection module 330 are implemented by the processor by executing a computer program (an instruction).

Figure 12:
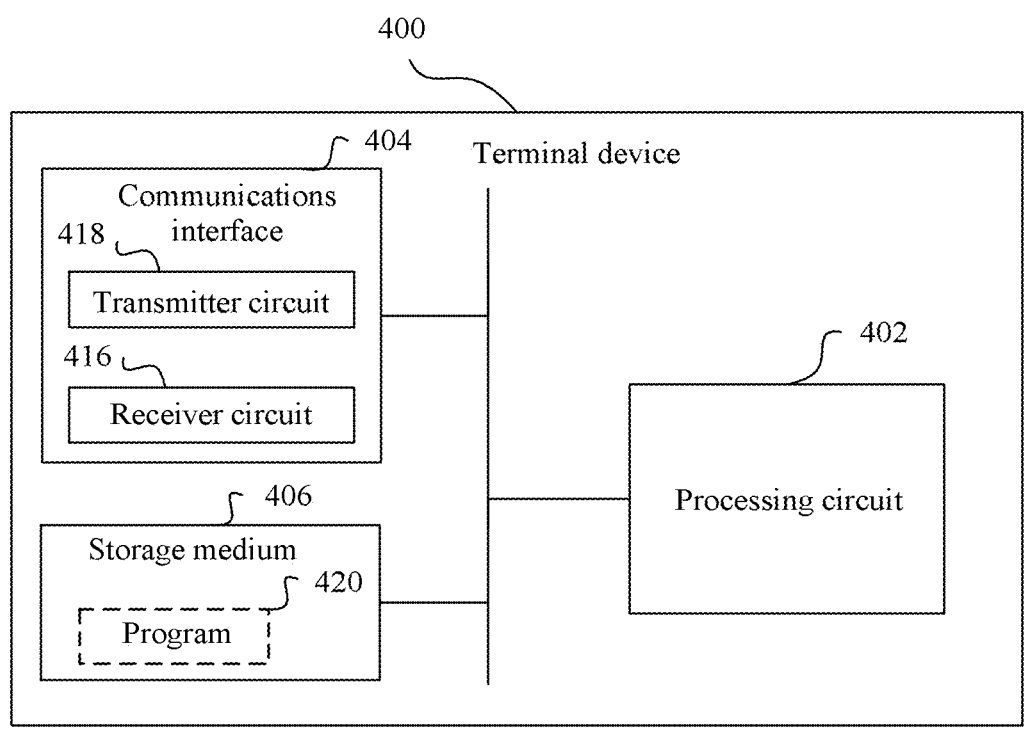
FIG. 12 is a schematic structural diagram of a terminal device according to another embodiment of this application.

An embodiment of this application further provides a terminal device 400. As shown in FIG. 12, the terminal device 400 includes a processing circuit 402, and a communications interface 404 and a storage medium 406 that are connected to the processing circuit 402.

The processing circuit 402 is configured to process data, control data access and storage, send a command, and control another component to perform an operation. The processing circuit 402 may be implemented as one or more processors, one or more controllers, and/or another structure that may be used to execute a program. The processing circuit 402 may further include at least one of a general purpose processor, a digital signal processor (DSP), an application-specific integrated circuit (ASIC), a field-programmable gate array (FPGA), or another programmable logic component. The general purpose processor may include a microprocessor, and any conventional processor, controller, microcontroller, or state machine. The processing circuit 402 may alternatively be implemented as a computing component, such as a combination of a DSP and a microprocessor.

The storage medium 406 may include a non-transitory computer readable storage medium, for example, a magnetic storage device (for example, a hard disk, a FLOPPY DISK, or a magnetic stripe), an optical storage medium (for example, a digital versatile disc (DVD)), a smart card, a flash memory device, a RAM, a ROM, a programmable ROM (PROM), an erasable PROM (EPROM), a register, or any combination thereof. The storage medium 406 may be coupled to the processing circuit 402 such that the processing circuit 402 can read information and write information into the storage medium 406. Further, the storage medium 406 may be integrated into the processing circuit 402, or the storage medium 406 and the processing circuit 402 may be separated.

The communications interface 404 may include a circuit and/or a program to implement bidirectional communication between the terminal device 400 and one or more network devices (for example, a router, a switch, and an access point). The communications interface 404 includes at least one receiver circuit 416 and/or at least one transmitter circuit 418. In an embodiment, the communications interface 404 may be completely or partially implemented by a wireless modem.

In an embodiment, the storage medium 406 stores a program 420, and the processing circuit 402 is adapted to execute the program 420 stored in the storage medium 406 to implement some or all steps in any method embodiment of this application.

An embodiment of this application further provides a computer readable storage medium. The computer readable storage medium stores code, an instruction, or a program that implements method steps in any method embodiment of this application.

It may be clearly understood by a person skilled in the art that for convenience and brevity of description, for detailed working processes of the foregoing apparatuses and units, reference may be made to the corresponding processes in the foregoing method embodiments. Details are not described herein again.

In the several embodiments provided in this application, it should be understood that the disclosed apparatuses and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to other approaches, or some of the technical solutions may be implemented in a form of a computer software product. The computer software product is stored in a storage medium, and includes several instructions for instructing a computer device (which may be a personal computer, a server, a network device, or the like) to perform all or some steps of the methods described in the embodiments of this application. The storage medium includes any medium that can store program code, such as a USB flash drive, a removable hard disk, a ROM, a RAM, or an optical disc.

What is claimed is:

1. A method for extracting web page content and implemented by a terminal device, the method comprising:
    identifying, using an operating system executed by the terminal device, a web page display component of an application program based on a feature of the application program or a feature of a control included in the user interface of the application program;
    setting, using the application program, the web page display component to load and display a web page comprised in a user interface of the application program;
    inserting, using the operating system, first code for content extraction and second code for information feedback into source code of the web page through an interface of the web page display component;
    extracting, using the first code, content corresponding to first web page coordinates from the web page based on a web event distributed by the web page display component, wherein the web event comprises the first web page coordinates; and
    transferring, using the second code, the content to the operating system.

2. The method of claim 1, further comprising identifying a first control matching a feature model based on the feature of the control, wherein the first control is the web page display component, wherein the feature of the control comprises at least one of a function feature or a behavior feature of the control, and wherein the feature model represents a common feature of a plurality of web page display components.

3. The method of claim 1, further comprising:
    searching a preconfigured first database for an identifier of the web page display component based on an identifier of the application program, wherein the preconfigured first database is configured to store a correspondence between the identifier of the application program and the identifier of the web page display component; and
    determining, from at least one control comprised in the user interface, a control with an identifier corresponding to the identifier of the web page display component, wherein the control is the web page display component, and wherein the at least one control comprises the web page display component.

4. The method of claim 1, further comprising determining an injection policy when the application program is installed or when the user interface is created, wherein the injection policy is related to an occasion for rejecting the first code and the second code, and wherein the injection policy comprises a first policy and a second policy.

5. The method of claim 4, further comprising searching a second database based on an identifier of the application program or an identifier of the web page display component to determine the injection policy corresponding to the web page display component, wherein the second database is configured to store a correspondence among the identifier of the application program, the identifier of the web page display component, and the injection policy.

6. The method of claim 1, wherein after the user interface of the application program is displayed, the method further comprises invoking, using the operating system, the interface to insert the first code and the second code into the web page, and wherein the first code and the second code are inserted into a source code of the web page or a web runtime corresponding to the web page.

7. The method of claim 1, further comprising:
invoking, using the operating system, the interface to insert the second code into the web page when the user interface is created; and
invoking, using the operating system, the interface to insert the first code into the web page after the user interface is displayed, wherein the first code and the second code are inserted into a source code of the web page or a web runtime corresponding to the web page.

8. The method of claim 1, further comprising:
traversing, using the first code, a document object model (DOM) tree of the web page to determine a target node corresponding to the first web page coordinates;
making a determination that a quantity of space characters comprised in second content corresponding to the target node is greater than a specified threshold; and
extracting, based on the determination, third content before a space character in the second content or fourth content after the space character in the second content.

9. The method of claim 1, further comprising:
traversing, using the first code, a document object model (DOM) tree of the web page to determine a target node corresponding to the first web page coordinates;
making a determination that a quantity of characters comprised in second content corresponding to the target node is greater than a specified threshold; and
extracting, based on the determination, characters with a specified length proximate to the first web page coordinates in the second content.

10. The method of claim 1, wherein the web event is a custom web event, and wherein the method further comprises:
distributing, using the operating system, a custom system event; and
converting the custom system event to obtain the custom web event.

11. The method of claim 10, wherein the custom system event is configured to trigger from a user operation or simulate using the operating system.

12. The method of claim 1, wherein an identifier of the application program is an identifier of an installation package of the application program, and wherein an identifier of the web page display component is signature information of the web page display component.

13. The method of claim 1, wherein the first code and the second code are JAVASCRIPT (JS) code or programs.

14. The method of claim 13, wherein the first code and the second code are configured to run in a JS execution environment, and wherein the method further comprises:
transferring, using the second code, the content to a page context using a JS binding mechanism; and
transferring, using the page context in a JAVA Native Interface (JNI) manner, the content to a system service running in a system runtime.

15. A terminal device, comprising:
a memory configured to store a computer program; and
a processor coupled to the memory, wherein the computer program causes the processor to be configured to:
identify a web page display component of an application program based on a feature of the application program or a feature of a control included in the user interface of the application program, wherein the application program runs on the terminal device;
set, using the application program, the web page display component to load and display a web page comprised in a user interface of the application program;
insert first code for content extraction and second code for information feedback into source code of the web page through an interface of the web page display component;
extract, using the first code, content corresponding to first web page coordinates from the web page based on a web event distributed by the web page display component, wherein the web event comprises the first web page coordinates; and
transfer, using the second code, the content to an operating system of the terminal device.

16. The terminal device of claim 15, wherein the computer program further causes the processor to be configured to:
establish a correspondence between an identifier of the web page display component and an identifier of the application program; and
store the correspondence in a database.

17. The terminal device of claim 15, wherein the computer program further causes the processor to be configured to:
search a preconfigured first database for an identifier of the web page display component based on an identifier of the application program, wherein the preconfigured first database is configured to store a correspondence between the identifier of the application program and the identifier of the web page display component; and
determine, from at least one control comprised in the user interface, a control with an identifier corresponding to the identifier of the web page display component, wherein the control is the web page display component, and wherein the at least one control comprises the web page display component.

18. The terminal device of claim 15, wherein the first code and the second code are JAVASCRIPT (JS) code or programs.

19. The terminal device of claim 18, wherein the first code and the second code are configured to run in a JS execution environment, and wherein the computer program further causes the processor to be configured to:
transfer, using the second code, the content to a page context using a JS binding mechanism; and
transfer, using the page context in a JAVA Native Interface (JNI) manner, the content to a system service running in a system runtime.

20. A computer program product comprising computer-executable instructions for storage on a non-transitory computer-readable medium that, when executed by a processor, cause a terminal device to:
identify a web page display component of an application program based on a feature of the application program or a feature of a control included in the user interface of the application program, wherein the application program runs on the terminal device;
set, using the application program, the web page display component to load and display a web page comprised in a user interface of the application program;
insert first code for content extraction and second code for information feedback into source code of the web page through an interface of the web page display component;
extract, using the first code, content corresponding to first web page coordinates from the web page based on a web event distributed by the web page display component, wherein the web event comprises the first web page coordinates; and transfer, using the second code, the content to an operating system of the terminal device.

* * * * *